F. LACEY.
FRICTION LET-OFF FOR LOOMS.
APPLICATION FILED MAR. 17, 1915.

1,260,272.

Patented Mar. 19, 1918.
10 SHEETS—SHEET 1.

Witnesses:
Oscar F. Hill
Ellen O. Spring

Inventor:
Fred Lacey
by Chas. F. Randall
Attorney.

F. LACEY.
FRICTION LET-OFF FOR LOOMS.
APPLICATION FILED MAR. 17, 1915.
1,260,272.
Patented Mar. 19, 1918.
10 SHEETS—SHEET 2.
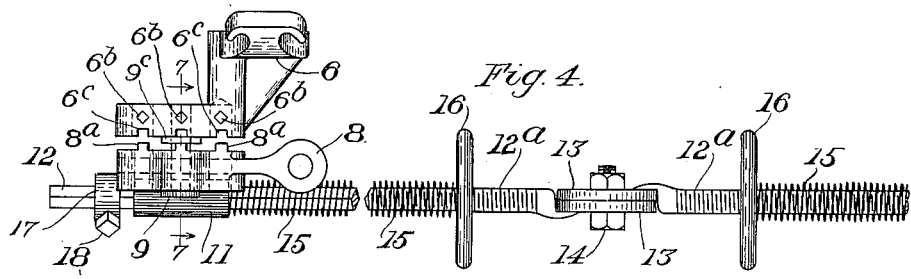
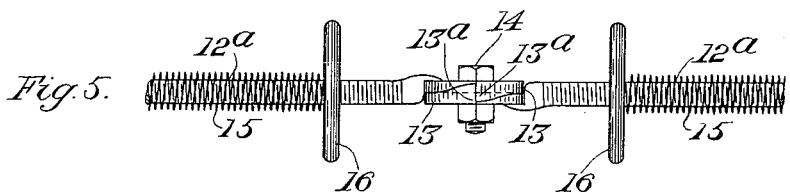
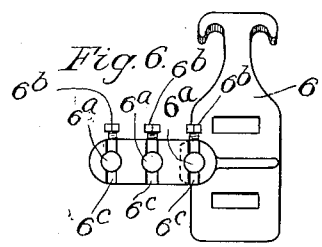
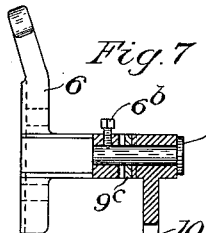
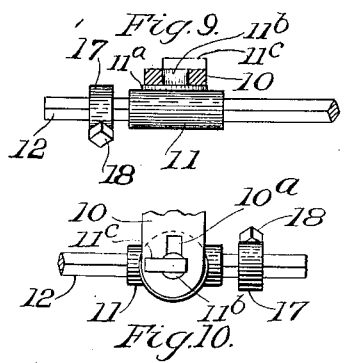
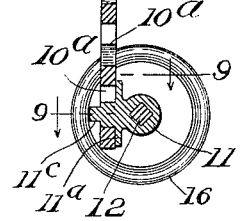
Witnesses:
Oscar F. Hill
Ellen O. Spring
Inventor:
Fred Lacey
by Chas. F. Randall
Attorney.

F. LACEY.
FRICTION LET-OFF FOR LOOMS.
APPLICATION FILED MAR. 17, 1915.
1,260,272.
Patented Mar. 19, 1918.
10 SHEETS—SHEET 3.
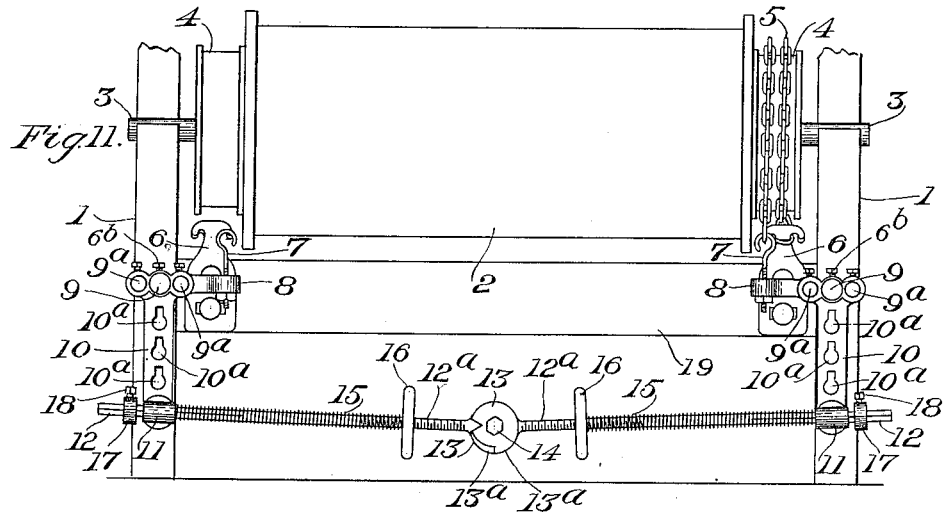
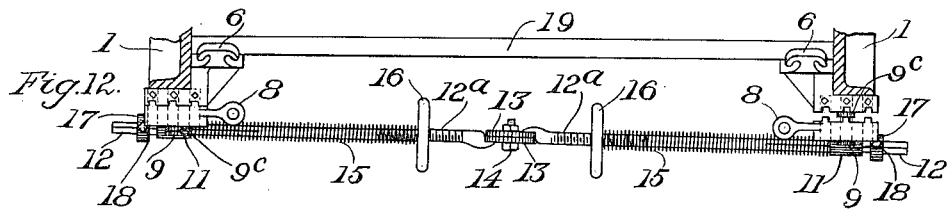
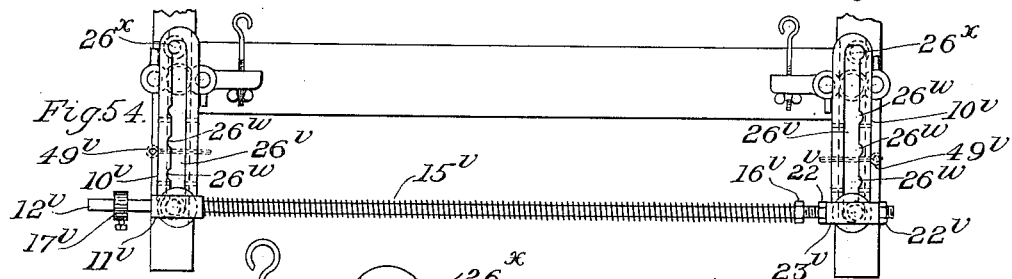
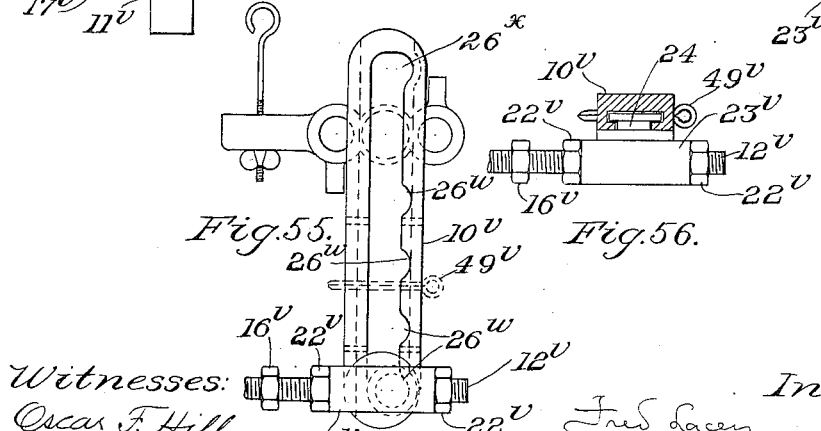
Witnesses:
Oscar F. Hill
Ellen O. Spring
Inventor:
Fred Lacey
by Chas. F. Randall
Attorney.

F. LACEY.
FRICTION LET-OFF FOR LOOMS.
APPLICATION FILED MAR. 17, 1915.
1,260,272.
Patented Mar. 19, 1918.
10 SHEETS—SHEET 4.
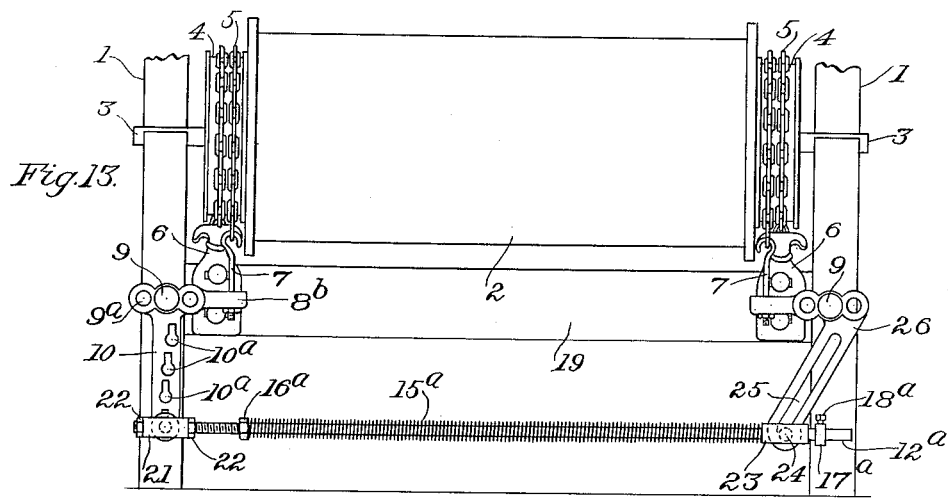
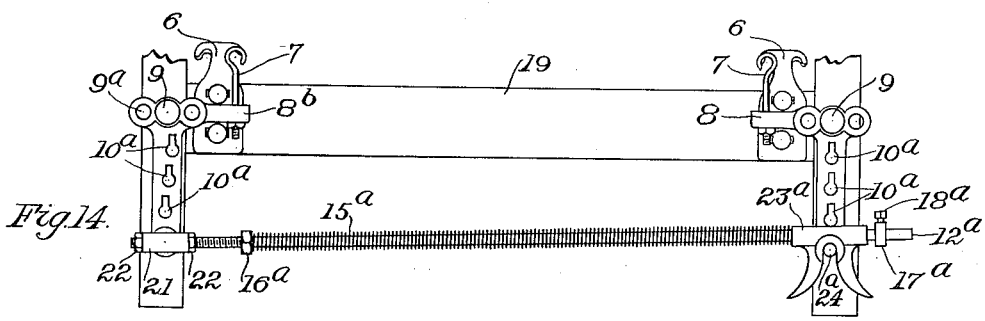
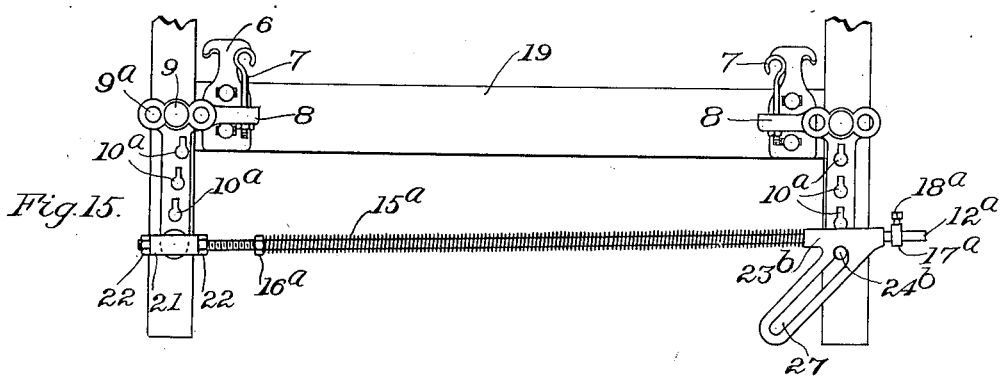
Witnesses:
Oscar F. Hill
Ellen O. Spring
Inventor:
Fred Lacey
by Chas. F. Randall
Attorney F. LACEY.
FRICTION LET-OFF FOR LOOMS.
APPLICATION FILED MAR. 17, 1915.
1,260,272.
Patented Mar. 19, 1918.
10 SHEETS—SHEET 5.
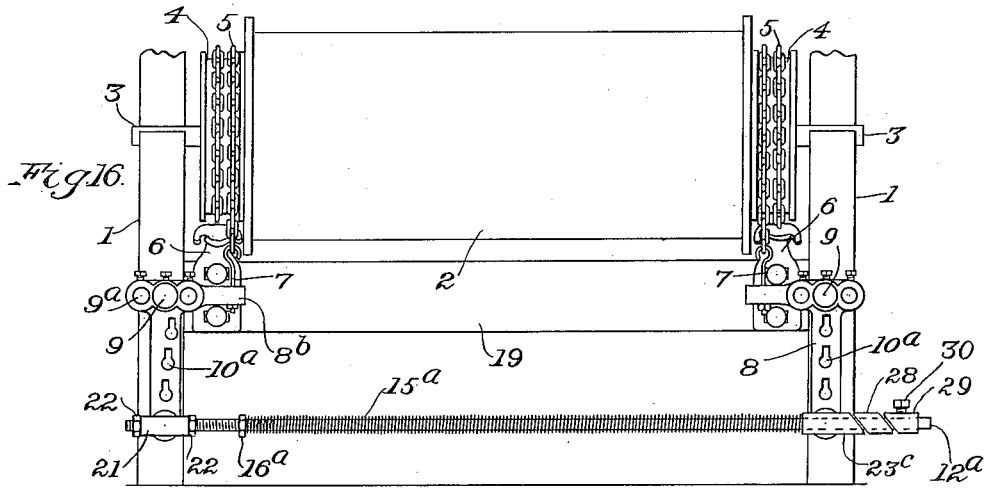
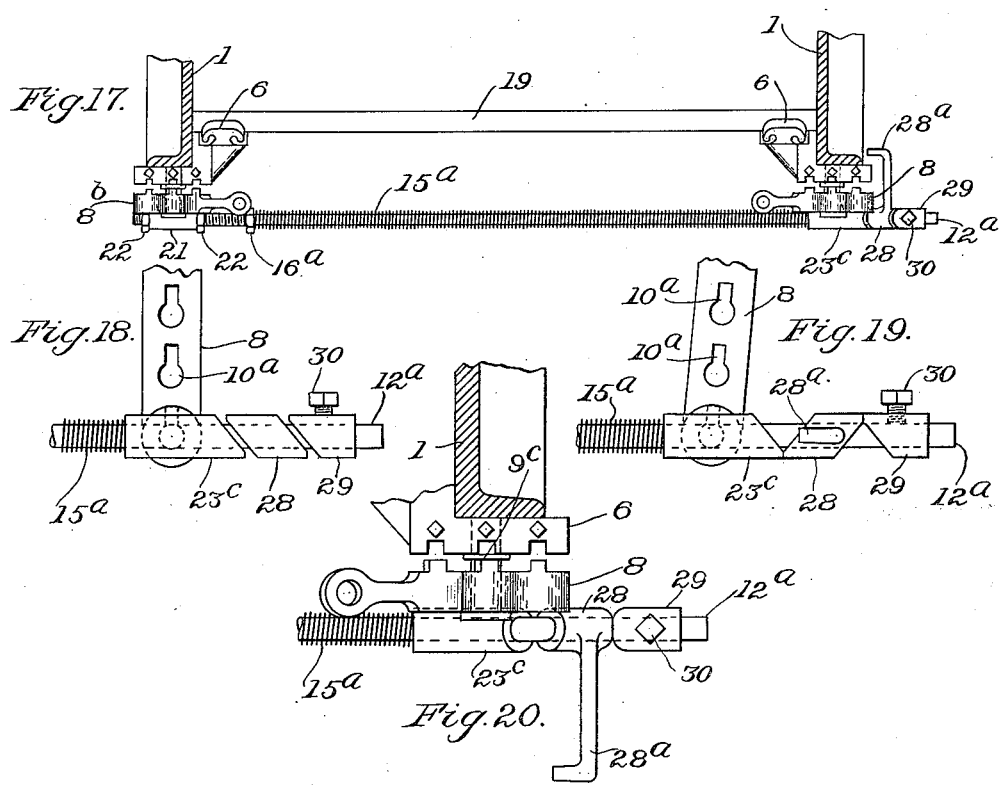
Witnesses
Oscar F. Hill
Ellen O. Spring
Inventor:
Fred Lacey
by Chas. F. Randall
Attorney.

F. LACEY.
FRICTION LET-OFF FOR LOOMS.
APPLICATION FILED MAR. 17, 1915.
1,260,272.
Patented Mar. 19, 1918.
10 SHEETS—SHEET 6.
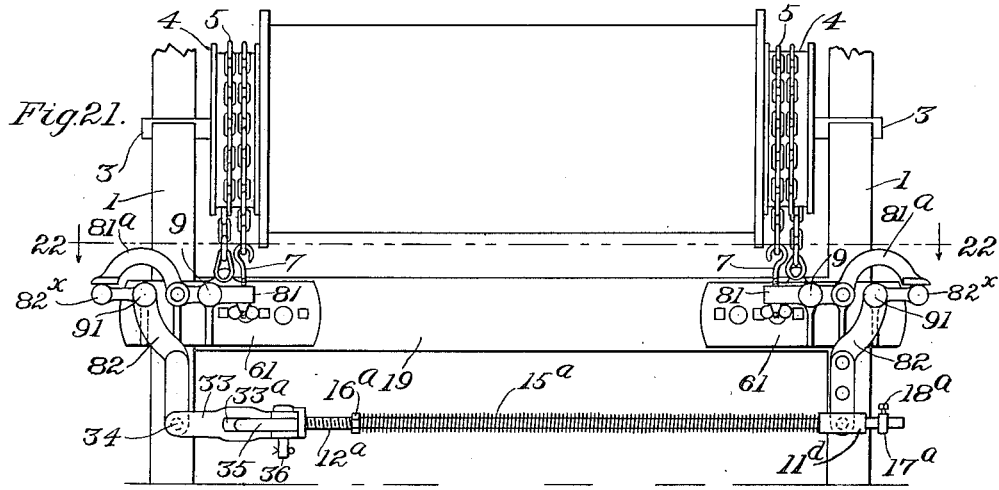
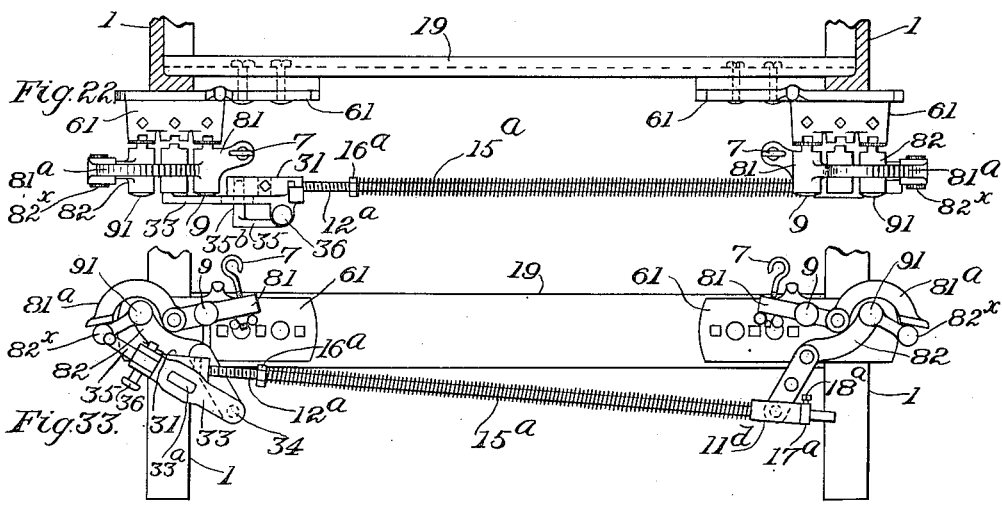
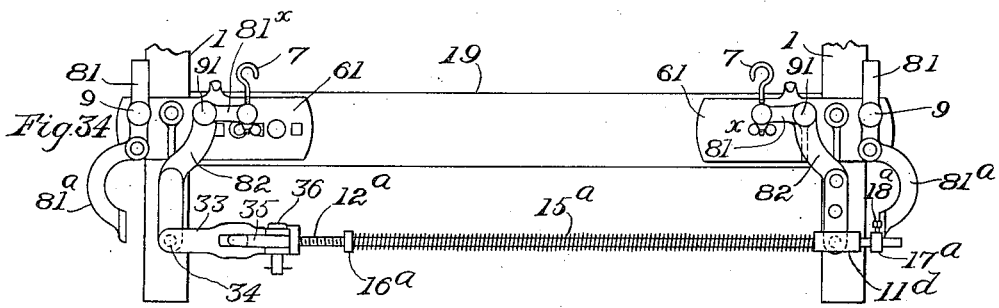
Witnesses:
Oscar T. Hill
L. A. Bartzach
Inventor:
Fred Lacey
by Chas. T. Randall
Attorney.

F. LACEY.
FRICTION LET-OFF FOR LOOMS.
APPLICATION FILED MAR. 17, 1915.
1,260,272.
Patented Mar. 19, 1918.
10 SHEETS—SHEET 7.
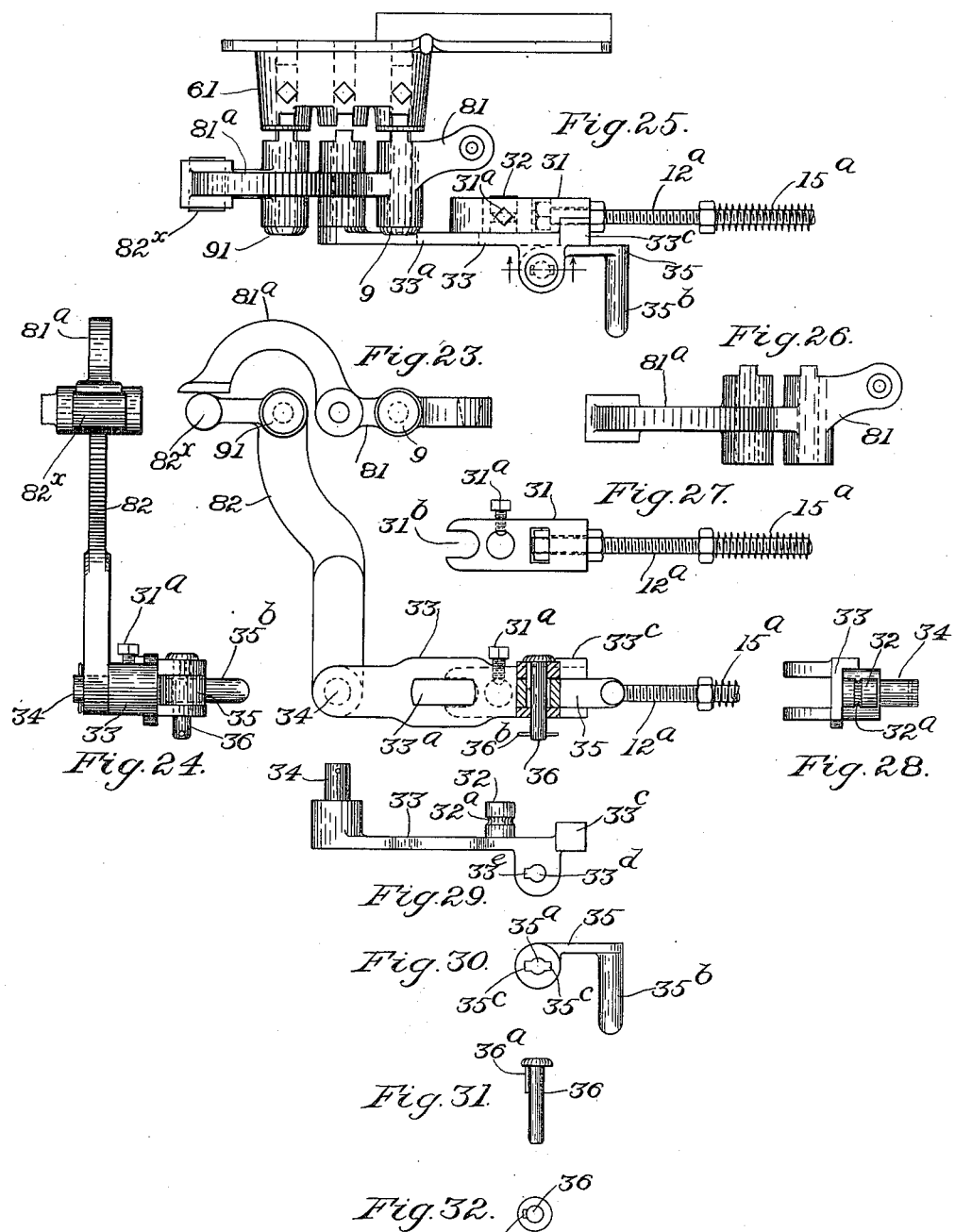

F. LACEY.
FRICTION LET-OFF FOR LOOMS.
APPLICATION FILED MAR. 17, 1915.
1,260,272.
Patented Mar. 19, 1918.
10 SHEETS—SHEET 8.
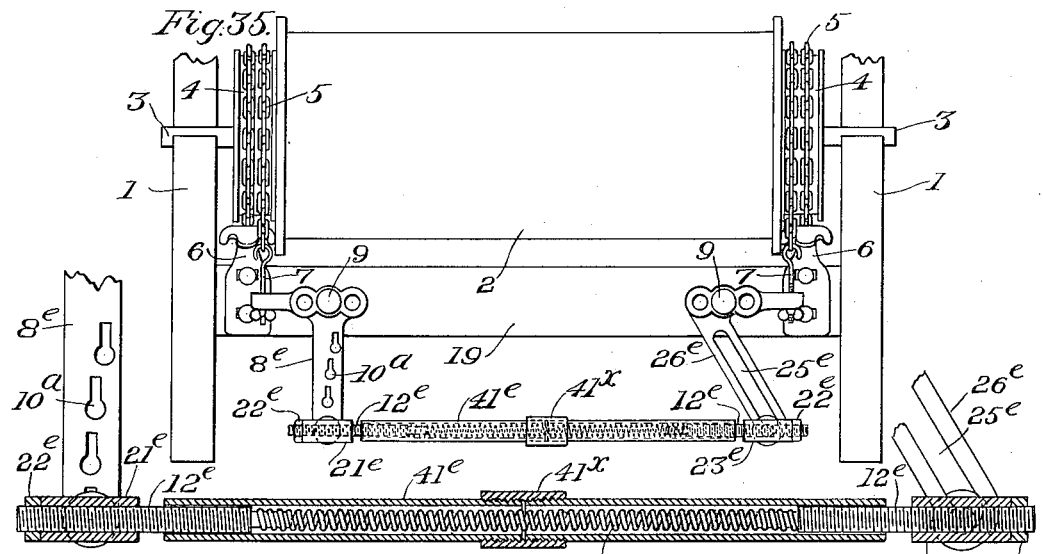
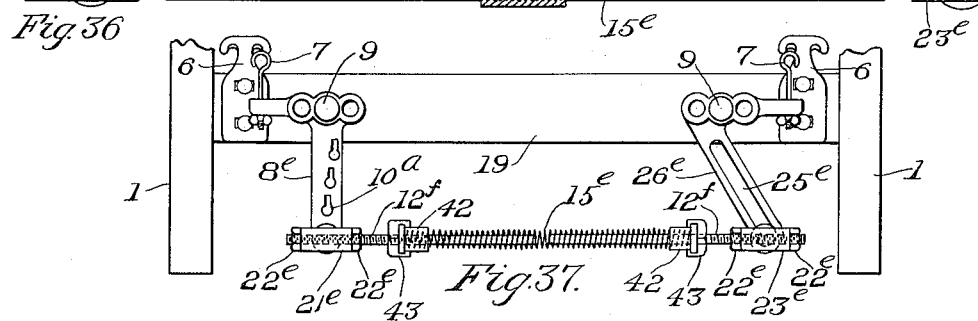
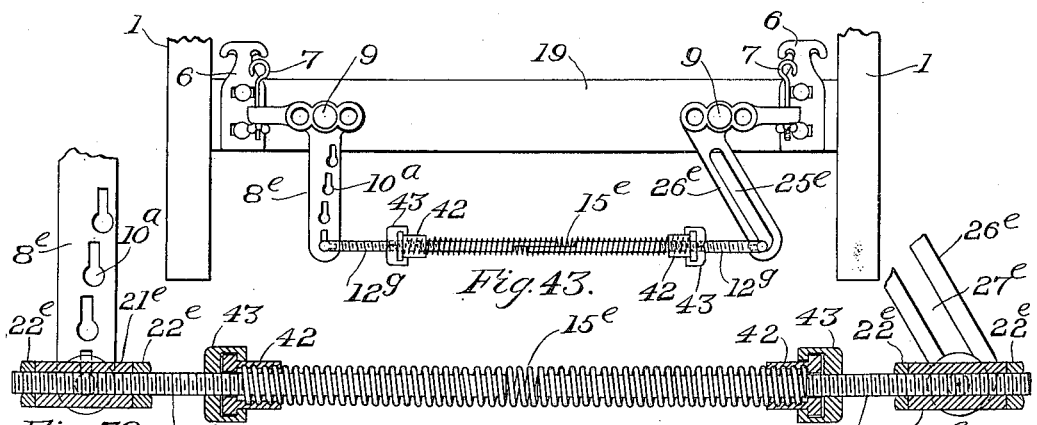
Witnesses:
Oscar F. Hill
C. A. Bartzsch
Inventor:
Fred Lacey
by Chas. F. Randall
Attorney.

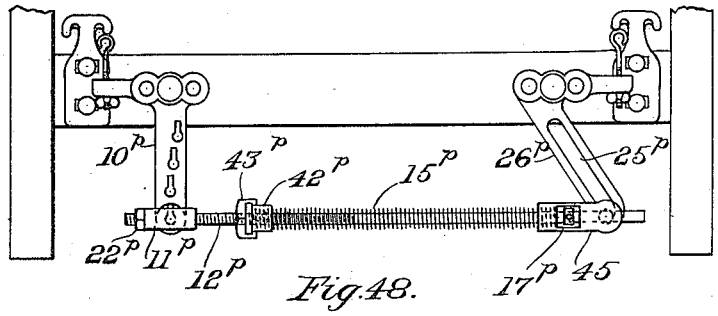
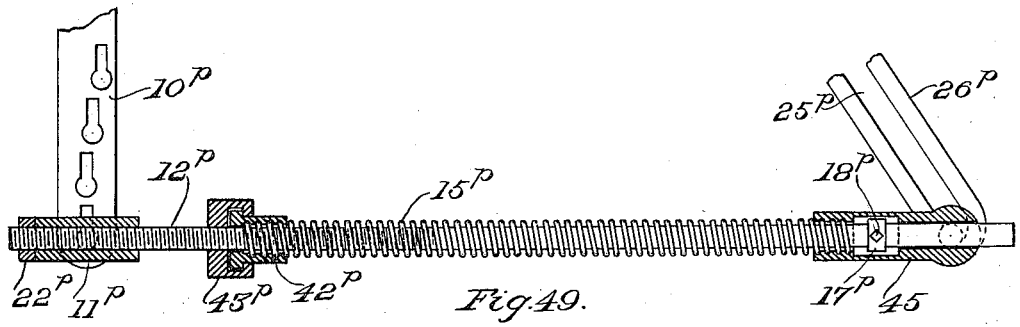
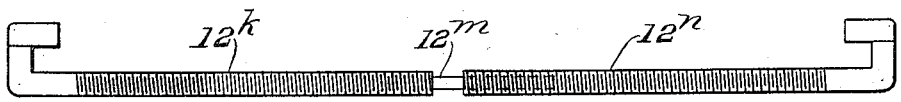
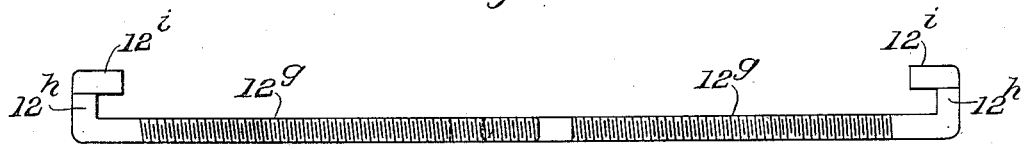

UNITED STATES PATENT OFFICE.

FRED LACEY, OF LOWELL, MASSACHUSETTS.

FRICTION LET-OFF FOR LOOMS.

1,260,272. Specification of Letters Patent. Patented Mar. 19, 1918.

Application filed March 17, 1915. Serial No. 15,049.

*To all whom it may concern:*

Be it known that I, FRED LACEY, a citizen of the United States, residing at Lowell, in the county of Middlesex, State of Massachusetts, have invented a certain new and useful Improvement in Friction Let-Offs for Looms, of which the following is a specification, reference being had therein to the accompanying drawings.

The invention comprises improvements in spring-actuated friction let-offs, for employment more particularly in connection with the warp-beams of looms, although not necessarily restricted thereto.

Weight-actuated friction let-offs are in general use in weaving, and spring-actuated friction let-offs are more or less known, although not in extensive use. The action of let-offs of both of such classes is to apply friction in connection with a warp-beam in a loom so as to oppose the turning of said beam, and through the frictional retardation control the unwinding of the warp by pull exerted on the latter, so that the warp shall be maintained under tension suitable for the weaving, and shall be permitted to unwind from the beam only at the rate required by the rate at which the warp is woven into cloth and the cloth drawn forward by the take-up mechanism of the loom.

During weaving, the warp in a loom is subjected to intermittent strains, some of which are due to the movements of the harness-frames in opening up sheds in the warp for the passage of the shuttle, while others are due to the action of the lay and reed in beating-up the successive picks of weft. These strains tend to turn the warp-beam forward, and in the case of a loom employing a friction let-off they operate to draw the warp from the warp-beam at the rate required for the weaving operation, in proportion as the woven cloth is taken up. Weight-actuated friction let-off devices in some instances have the advantage that such devices permit the warp-beam to turn forward when the intermittent strains come, so that thereby such strains are accommodated, and then, when such strains cease, act to turn the warp-beam reversely sufficiently to keep the warp-tension normal. The explanation of this reverse turning of the warp-beam is that in the forward turning movement of the warp-beam just referred to the beam-head or ruffle, acting within the encircling portion of the friction-chain, acts through the said chain with a tendency to raise the weight-lever and weight. When the intermittent strains cease, the weight descends and in descending acts through the chain and the frictional engagement of the latter with the beam-head or ruffle to turn the warp-beam reversely as far as permitted by the tension of the portion of warp extending through to the woven cloth.

Weight-actuated friction let-off devices, however, present in their operation certain drawbacks. One of these is the fact that sometimes the forward rocking movement of the warp-beam acts through the chain to move the weight-lever so as to lift the weight suddenly, so that the quick rise of the latter, and the overthrow thereof due to momentum, relieve the chain more or less of the effect of the weight for the time being, so that the friction upon the beam-head or ruffle is lessened, which allows the warp-beam to turn too easily under a sudden strain occurring at such time, as for instance that due to the beating-up operation. It will be understood that the said lifting of the weight-lever usually takes place as the shed is formed for the next flight of the shuttle. The effect of the beating-up of the preceding weft-shot just as an extra heavy shed is opened frequently is that the warp-beam is caused to jump forward and to slip relatively to the friction-chain, so that an unnecessary paying out of warp occurs and "rowey" goods are produced.

Some of the drawbacks of weight-actuated friction let-offs, including the foregoing, are due in large part to the fact that a weight is "logy"; that is to say, when employed in connection with a let-off lever it starts tardily, going up too late in yielding to increase of strain tending to draw the warps off the warp-beam, and going down too late when the strain ceases. When once started to going up, its effect as a friction-producing means becomes diminished during the upward movement. In addition its inertia and momentum carry it beyond the point to which it is actually necessary it should yield. Hence when a weighted let-off lever lifts suddenly it goes up too loosely, An additional consequence of this last feature is that in dropping, the weight-lever takes up the slack in the chain with a jerk tending to snap the warp yarns. The bad effects are particularly noticeable in weaving the last cut from the warp-beam as the warp unwinds from a small diameter.

Another drawback of a weight-actuated friction let-off is the fact that for weaving some classes of goods more weights have to be hung upon a let-off lever than for weaving goods of other classes. When the additional weights are not needed they are taken away from the looms, and require to be stored; when needed again, they must be brought back to the looms. This entails handling and transportation, in addition to the necessity for providing storage accommodations. It happens sometimes that weights that have been removed from certain looms and taken away for storage become misplaced and lost, or are applied to use on other looms, and consequently cannot be found or had when needed.
Spring-actuated friction let-offs have been used, but as heretofore constructed most of them have drawbacks and disadvantages equally as undesirable and inconvenient as those incident to weight-actuated let-offs.
Springs have advantages over weights. They do not have the drawbacks incident to the inertia and momentum of weights. They respond quickly and lightly at first, their tension becoming progressively stronger.
The general aim of the invention is to provide spring-actuated friction let-off devices which shall be free from the drawbacks and disadvantages aforesaid of prior let-off devices of both of the named classes of let-offs. Another is to provide spring-actuated friction let-off devices which will compensate for varying strains by permitting forward rocking movement of the warp-beam to accommodate strains due to shedding and beating-up, and then as such strains lessen will act to rock the beam backwardly to take up slack and maintain uniformity of warp tension. More special aims of the invention are to provide for the employment of a spiral spring of considerable length, which is important inasmuch as a long spring has greater resiliency than a short one. It also is less subject to breakage. Also, to permit the employment of a highly resilient spring, light and sensitive in respect of the letting-off action. Also, to provide for a wide range of adjustment of the amount of friction. Also, to provide for readily throwing the friction off and on, and to produce devices which will enable the friction to be restored just as it was prior to being thrown off. Also, to provide for the friction being thrown off and on again by the foot of the weaver while his hands are occupied with the beam or warps.

The drawings show various embodiments of the principles and features of the invention.

Figure 1, Sheet 1, is a rear elevation of a portion of a loom frame with a warp-beam and one embodiment of my invention mounted thereon, the parts being in working positions and relations.

Figure 1:
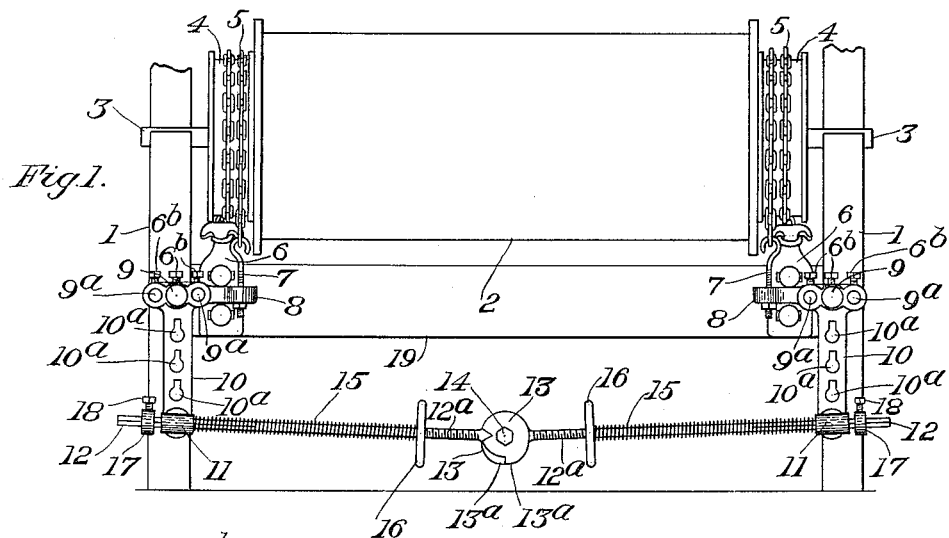
Figure 2:
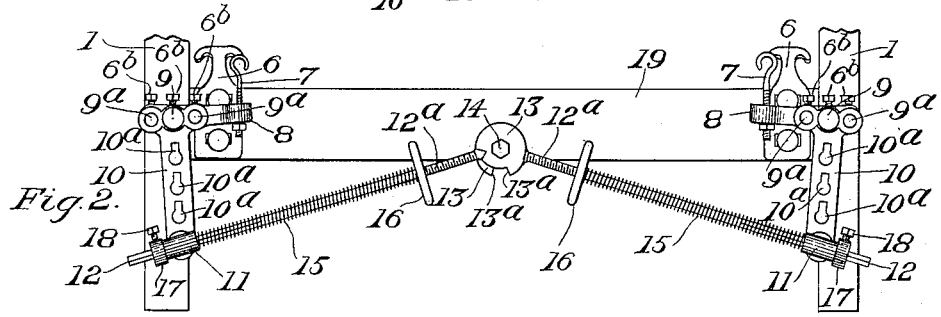
Fig. 2 is a rear elevation with the warp-beam removed and the parts positioned as when the friction is thrown off.

Figs. 4 to 10, Sheet 2, are views of details of the embodiment shown in Figs. 1 and 2.

Fig. 11, Sheet 3, is a rear elevation, and Fig. 12 is a partial plan, of the devices of Figs. 1 and 2 when arranged to apply friction in connection with one end only of the warp beam.

Figs. 13, 14 and 15, Sheet 4, and Figs. 16 to 20, Sheet 5, show various embodiments of the invention having simple lever arrangements.
Figs. 21 and 22, Sheet 6, are views showing an embodiment having a compound lever arrangement.

Figs. 23 to 32, Sheet 7, are views of details of the said compound lever arrangement.

Figs. 33 and 34, Sheet 6, show the compound lever arrangement of Figs. 21 to 32 adjusted to act with simple leverage.

Fig. 35 is a rear elevation showing an embodiment of the invention containing a contracting or pull-spring.

Fig. 36 is a sectional detail view on an enlarged scale showing more particularly the spring of Fig. 35 and the parts which in such view are most closely associated with the spring.

Fig. 37 is a rear elevation, omitting the warp-beam and chains, showing another embodiment employing a contracting or pull-spring.

Fig. 38 is a sectional detail view on enlarged scale showing the spring and associated parts of Fig. 37.

Figs. 39 to 42, inclusive, are views of details of the embodiment shown in Figs. 37 and 38.

Fig. 43 is a rear elevation, also omitting the warp-beam and chains, showing a further embodiment employing a contracting or pull-spring.

Figs. 44, 45, 46, 47 are detail views on enlarged scale showing various forms of rods adapted to be employed in connection with contracting or pull-springs.

Fig. 48 is a rear elevation similar to Figs. 37 and 43, but showing a further embodiment of the invention employing a contracting or pull-spring.

Fig. 49 is a sectional detail view on enlarged scale showing the spring and associated parts of Fig. 48.

Figure 50:
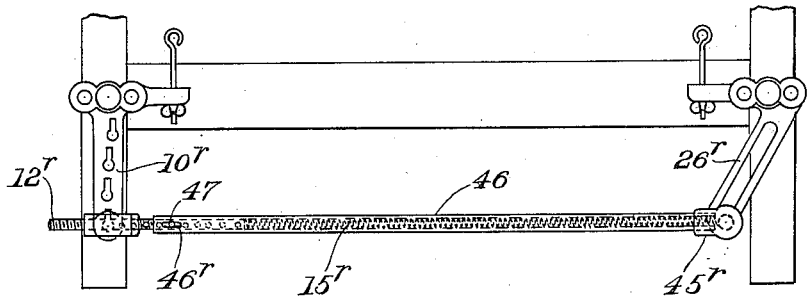
Figure 51:
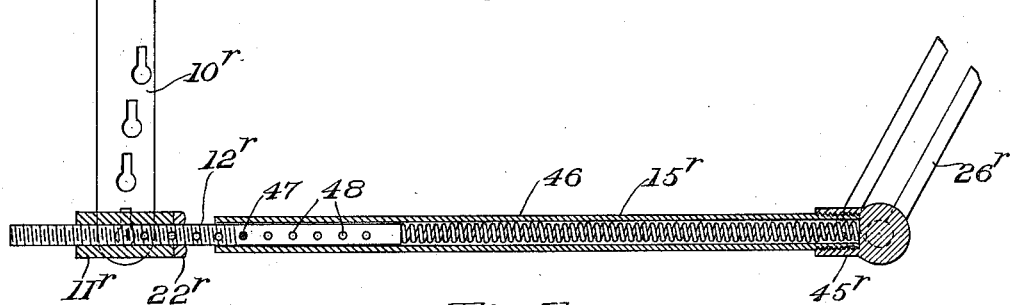
Figure 52:
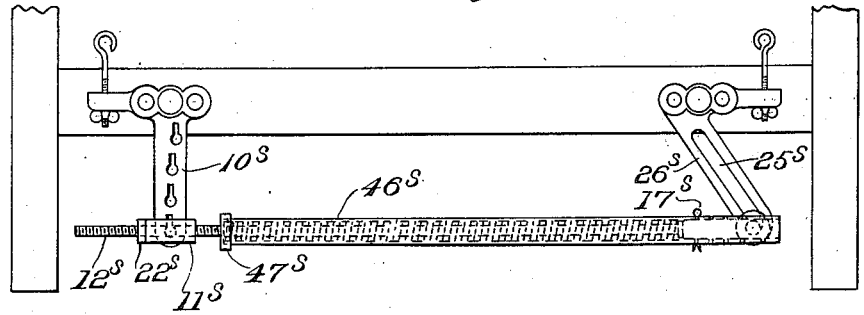
Figure 53:
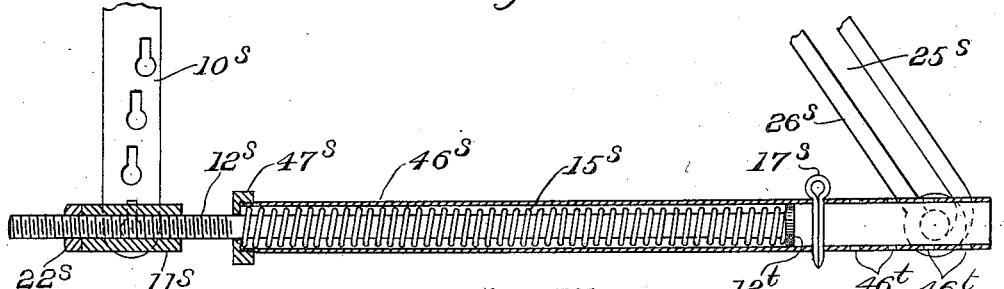

Figs. 50 and 51 show a further embodiment containing an expansion spring; Figs. 52 and 53 show still another.

Figs. 54, 55 and 56, Sheet 3, show an embodiment containing a modification of the means of connection between the swiveling collars 11ᵛ, 23ᵛ, and the let-off levers.

In various views of the drawings, portions of the side-frames 1, 1, of a loom are represented, and in Fig. 1 and certain other views a warp-beam 2 filled with warp is shown mounted by means of journals 3, 3, in bearings in the said side-frames. The cylindrical portions 4, 4, usually termed "ruffles," in connection with the heads of the said beam, are represented as having ordinary friction chains 5, 5, wrapped around the same in usual manner, each of the said chains having one end thereof engaged with the horns of a bracket 6 fixed upon the loom girth 19, and its other end engaged with a hook 7 applied to the horizontal arm of one of the let-off levers 8. Each let-off lever is shown pivoted by means of a fulcrum-pin or bolt 9 (see in particular, Fig. 7) upon the corresponding stand or bracket. One of the said brackets 6 is shown in detail in plan in Fig. 4, in rear elevation in Fig. 6, and in partly-sectional side elevation in Fig. 7. One of the let-off levers is shown in detail in vertical section in Fig. 7 and in rear elevation in Fig. 8.

Having reference, first, to the embodiment shown in Figs. 1 and 2 and the accompanying detail views on Sheet 2 of certain of the features of the invention;—

This embodiment contains certain of the generic features of the invention. It affords an example of the employment of the longitudinally expanding or push type of spiral spring, and illustrates a use of two springs and of two rods in connection therewith. Examples of the employment of the longitudinally contracting or pull type of spiral spring, and of single springs and single rods, are presented in other embodiments shown and described herein of the various features of the invention.

The two springs employed in this first embodiment for actuating the let-off levers to tighten the friction chains around the heads or ruffles of the warp-beam are shown at 15, 15, there being one thereof adjacent either let-off lever. As will be perceived, the said springs are both of considerable length. The two rods employed in connection with such springs, and serving as supports and guides therefor, are shown at 12, 12. The inner ends of the said rods are joined together by a pivot 14. For convenience in making the joint, the said inner ends are provided with flat disk-shaped heads 13, 13, which fit together side by side, as shown more particularly in Figs. 4 and 5, Sheet 2, which are plan and bottom views, respectively, of the two rods and some of the parts in connection therewith. The connecting pivotal bolt or pin 14 occupies central holes in the two flat heads. The outer portions of the rods pass through and project beyond collars or sleeves 11, 11, which are engaged with the downturned arms 10, 10, of the let-off levers. The fit of the rods within the said collars or sleeves 11, 11, is such as to permit sliding movement of the rods and said collars or sleeves with relation to each other. The springs 15, 15, respectively, are mounted upon the respective rods 12, 12, and encircle the latter between the collars or sleeves 11, 11, and fixed collars 16, 16, with which the rods are provided. They are confined and compressed lengthwise between said collars or sleeves 11, 11, and said fixed collars. Consequently, each spring acts expansively in one direction against the collar 16 of the rod encircled by such spring, and in the other direction against the collar or sleeve 11 through which such rod passes. By the pressure transmitted to the collars or sleeves 11, 11, the let-off levers are actuated. To provide for regulating the frictional resistance by which the turning of the warp-beam for the delivery of warp is controlled, the collar 16 of each rod is made adjustable along the rod toward and from the collar or sleeve 11, so as to enable the spring to be compressed more or less between them. For convenience in making the adjustment, the collar 16 in this instance is formed as a nut and screwed upon a threaded portion 12ᵃ of the rod, as shown best in Figs. 4 and 5. By being made of enlarged size and adapted to serve as a hand-wheel, the turning of collar 16 in making adjustments is facilitated. The construction of the collars or sleeves 11, 11, is shown more particularly in Fig. 9 of Sheet 2, which is a plan view partly in section on line 9, 9, of Fig. 7, and in Fig. 10, which is a front elevation of the parts shown in Fig. 9. Each collar or sleeve 11 is engaged with the corresponding let-off lever with capacity to swivel relative thereto in a vertical plane.

It has been explained that the pressure of each spring 15, is partly exerted outwardly against the corresponding collar or sleeve 11, and partly inwardly against the corresponding collar 16. This inward pressure or reaction of each of the springs 15, 15, tends to push the corresponding rod away from the let-off lever with which it is combined, toward the opposite side of the loom, so as to transmit pressure to the let-off lever at that side of the lever also. As one result of this, when the rods are in the straight condition of Fig. 1 the combined power of the two springs is exerted in tending to swing the two let-off levers in opposite directions with respect to each other. The two levers are acted upon with equal force, so that, other conditions being equal, the friction at both ends of the warp-beam is equal. The effect is the same as though a single spring were interposed between the two levers, and in fact in some cases I omit one spring and lock the corresponding rod to its collar or sleeve 11 so as to prevent longitudinal movement of the rod with relation thereto.

As connected together pivotally at their inner ends and mounted at their outer ends in the collars or sleeves 11, 11, engaged with the let-off levers, the rods 12, 12, are adapted to occupy a practically straight position substantially in line with each other as in Fig. 1, and also are adapted to be swung from such position into a position in which they are bent upward at an angle to each other as in Fig. 2. They form a toggle. In the practically straight and extended condition of the said toggle represented in Fig. 1 the tension of the springs 15, 15, (or of the single spring when one spring is omitted) is utilized to apply outwardly-acting pressure to members 11, 11, to actuate the let-off levers to create the friction by which the turning of the warp-beam is controlled. In the bent or "broken" condition of the toggle represented in Fig. 2, the rods 12, 12, and their collars 16, 16, are drawn inward somewhat toward each other. In some cases this inward movement of the rods and collars 16, 16, may be utilized to reduce the outwardly-acting pressure of the springs 15, 15, (or single spring) sufficiently to relieve the frictional engagement of the chains 5, 5, with the beam-heads or ruffles 4, 4, enough to permit the warp-beam to be turned conveniently by hand. In these cases, the pressure of the springs (or spring) will be reinstated and the friction thrown on again when the rods are caused to resume the straight condition of Fig. 1. A special feature of the invention, however, consists in means for "throwing-off" the friction by relieving the let-off levers from the effects of the spring tension without any material lessening of the tension of the spring or springs employed, and for "throwing the friction on" again, the said means being arranged to operate without any loss or change of adjustment in either case. Figs. 1, 2, etc., show means for this purpose embodying the principle of combining with a let-off lever, and its connections including an actuating spring, a stop which in the working position of the parts permits operation of the let-off lever by the spring, while by the throwing-off movement it is made operative to stop-off the spring by limiting the extent of the endwise expansion of the spring so as to prevent it from operating the left-off lever, and in addition, if desired, is made operative to retract the let-off lever to relieve the friction upon the beam-head or ruffle. This means, in Figs. 1, 2, etc., comprises stop-collars 17, 17, mounted upon the portions of the rods 12, 12, that project outward beyond the collars or sleeves 11, 11, and fixed upon such portions by means of clamping screws providing for any necessary adjustment along the rods. The two stop-collars are located upon the outer portions of the rods 12, 12, at such points that when the said rods occupy their straightened-out working position as in Fig. 1 there will be a clear space between each stop-collar and the outer end of the adjacent collar or sleeve 11. This clear space or clearance permits outward play of the adjacent coupling collar or sleeve 11, in the working position shown in Fig. 1, so that the adjacent spring 15 is allowed to act expansively against the said coupling collar or sleeve 11 to actuate the corresponding let-off lever to apply friction to the warp-beam. It also permits the let-off devices to accommodate themselves to any irregularities or eccentricity of a beam-head; in other words, in the relations of the parts which are illustrated in Fig. 1, the let-off levers are controlled entirely by the elastic force of the springs, and are enabled to keep the friction-chains drawn tightly around the beam-heads or ruffles, as well as to accommodate themselves to irregularities of the beam-heads or ruffles. When the rods are bent upward, they will draw inward through the coupling collars or sleeves 11, 11, until the stop-collars 17, 17, bring up against the outer ends of the said coupling collars or sleeves. As soon as this happens, the effect of springs 15, 15, in tending to turn the let-off levers upon their pivotal supports or fulcra is stopped-off, i. e., neutralized, and the warp-beam is practically free to be turned by the weaver. This will be the case, regardless of the remaining degree of tension of the springs 15, 15, and even though in the position of the parts in Fig. 2 the springs 15, 15, still may be under compression giving them a length much shorter than the normal length of the springs. Continued bending of the rods upward will cause the stop-collars 17, 17, to swing the let-off levers inward as in Fig. 2 so as thereby to slacken the friction-chains.

The inward reaction of the two springs 15, 15, from the collars or sleeves 11, 11, in opposite directions relative to each other, tends to move the respective rods 12, 12, lengthwise inward toward each other. One effect of this is that when the pivot 14 of the toggle is placed by the weaver in the locking position shown in Fig. 1, namely below a straight line extending from one collar or sleeve 11 to the other, the springs act to keep it in such position, with the stop-shoulders 13ª, 13ª, on the respective flat heads 13, 13, of the two rods in stop-engagement with each other. A further effect of the said inward reaction is that when the point of pivotal connection between the two rods is lifted by the weaver above the said line, the inwardly acting pressure of the two springs, reacting from the inner ends of collars or sleeves 11, 11, operates with a tendency to force the joined inner ends of the rods upward toward the position occupied in Fig. 2, and to keep them in the latter position. The result would be the same if the spring were omitted from one rod and such rod locked to its collar or sleeve 11.

By preference, I employ springs 15, 15, which are highly resilient, light, and sensitive in respect to the letting-off action. In order to secure the required degree of outward pressure against the down-hanging arms of the let-off levers in the working position of the parts shown in Fig. 1, such springs require to be of considerable length, and to be compressed to a considerable extent between collars 16, 16, and the collars or sleeves 11, 11. If such long springs were allowed to extend themselves fully in bending the rods upward, the joined inner ends of the rods would be thrown up too high toward the warp-beam. The stop-collars 17, 17, however, by engagement with the coupling collars or sleeves 11, 11, limit the inward movement of the rods relative to the said collars or sleeves, and the extent of the upward bending of the rods. These stops may be replaced by pins set in holes in the portions of the rods which project outward beyond the collars or sleeves 11, 11, and to enable adjustment to be effected there may be a series of the said holes in each rod so that the pins may be shifted from hole to hole. Preferably, however, I employ the stop-collars 17, 17, and fasten them in place by means of clamping screws 18, 18, which permit them to be adjusted upon the rods in the direction of the length of the latter, toward or from the point of pivotal connection of the rods shown in Fig. 2.

The parts are so located in a loom that when the rods, etc., occupy the positions shown in Fig. 1, the friction being "on", the weaver may slip his foot beneath said rods and by lifting the foot may raise the rods so as to cause them to assume the position shown in Fig. 2, to "throw off" the friction. The space beneath the warp-beam is sufficient to permit the rods to assume said position of Fig. 2, and to permit the weaver to apply his foot to the upwardly bent rods for the purpose of pressing them down again into the position of Fig. 1.

When it is desired by the weaver to throw off the friction, and he applies his foot or hand to lift the inner ends of the rods, the springs act as already described to force the joined inner ends upward until the stop-collars 17, 17, engage with the outer ends of the collars or sleeves 11, 11. A slight additional lift of the bent or broken toggle by the weaver to its position in Fig. 2 will draw the rods 12, 12, farther inward so as to cause the stop-collars 17, 17, to act against the outer ends of the collars or sleeves 11, 11, to swing the down-hanging arms of the let-off levers inward and thereby rock the said levers so as to slacken the chains completely.

An important difference between comparatively stiff springs such as may be employed in some cases, and the highly resilient, light and sensitive springs which I prefer, is the fact that in the case of the comparatively stiff springs a very small difference in the position of the adjusting collars 16, 16, will produce a marked variation in the tension and effect of such springs, whereas with the highly resilient springs, they are less affected by a small difference in the said position. It is therefore possible to make a finer adjustment of the tension of the highly resilient springs.

Variations in the leverage are provided for by means of a series of holes 6ª, 6ª, Fig. 6, in each bracket 6, and a corresponding series of holes 9ª, 9ª, Fig. 8, in each of the let-off levers, adapted to receive the fulcrum-pins 9, 9, for such levers. By removing a fulcrum-pin 9 from the holes in bracket and lever occupied by it in Figs. 1, 2, 4 and 7, and shifting such pin into one of the other holes of the lever and into a corresponding hole in the bracket, the leverage in connection with such lever may be varied to increase or decrease the frictional action in proportion to the character of the goods being woven, or to variations in the diameter of the yarn mass upon the warp-beam. The fulcrum-pin is fastened removably by a clamping screw 6ᵇ in the hole in which it is seated in the bracket 6. To enable the leverage to be varied still further, I make provision for shifting the points of engagement of the collars or sleeves 11, 11, with the vertical arms of the let-off levers toward or from the fulcra of the said levers. For this purpose I form in the down-hanging arm of each of said levers a series of slots 10ª, 10ª, at different distances from the fulcrum of the lever, to receive the pin which connects the corresponding collar or sleeve 11 with said arm. This permits me to shift the said collar or sleeve up or down upon the said arm so as to place it at the distance from the fulcrum of the lever which will give the required leverage and frictional action.

In ordinary practice the fulcrum-pin 9 of each lever is shifted to vary the action as found necessary for different weights of goods. The nut 16 is adjusted so as, at the outset, to compress the spring 15 to the extent required by the diameter of the full-sized yarn-mass for the particular goods being woven. As the yarn-mass upon the warp-beam decreases in diameter, the said nut is adjusted from time to time by the weaver so as to reduce the compression of the spring 15. Should these two adjustments prove insufficient, either to suit the weight of goods desired to be manufactured or to compensate for the varying diameter of the yarn-mass, the collars or sleeves 11, 11, are shifted toward or from the fulcrum-pins 9, 9, to vary the leverage. As a convenient provision for removably connecting a collar or sleeve 11 with the down-hanging arm 10 of a let-off lever, and holding it securely engaged therewith while in the positions assumed by it in use, and at the same time providing for ready disconnection at one point of the lever and re-connection at another, I form the slots 10$^a$, 10$^a$, in the shape of buttonholes, as in Figs. 1, 2 and 8, and provide the collar or sleeve 11 with a flat back 11$^a$, Fig. 9, to fit against the front surface of the said arm, and also provide it with a round stud-portion or pin 11$^b$ to fit in a rounded part of the buttonhole slot, and with a transversely projecting arm 11$^c$ at the end of the said cylindrical stud-portion or pin. In making application of the collar or sleeve 11 to the arm 10, the collar or sleeve is turned into a position which presents the arm 11$^c$ to the elongated portion of the buttonhole slot. The arm and stud-portion or pin may then be passed through the slot. When the arm 11$^c$ is at the back of the arm 10, the collar or sleeve 11 is turned part way around into its working position, in which the arm 11$^c$ of the said collar or sleeve extends crosswise of the buttonhole slot, as in Figs. 9 and 10. The engagement of the said arm 11$^c$ with the rear face of the arm 10 at one one side of the slot holds the collar or sleeve locked to the arm 10 without, however, interfering with the capacity of the collar or sleeve to swing or oscillate upon the stud-portion or pin 11$^b$ in conforming to the various inclinations of the rod 12. The rod 12 is then caused to extend through the collar or sleeve 11. While the rod occupies the collar or sleeve and the parts are in the positions shown in Figs. 1 and 2, the collars or sleeves cannot turn into position to become detached from the let-off levers.

Preferably, though not necessarily in all cases, the portion of a rod 12 that plays within a collar or sleeve 11 is of rectangular or other non-circular cross-section, and the hole through the collar or sleeve 11 is shaped to fit such portion of the rod. This prevents the rod from revolving within the collar or sleeve, and thereby the joint between the connected rods is kept in position to swing in a vertical plane, as required.

Other means of holding the rods 12, 12, from turning may be employed in practice.

Figure 3:
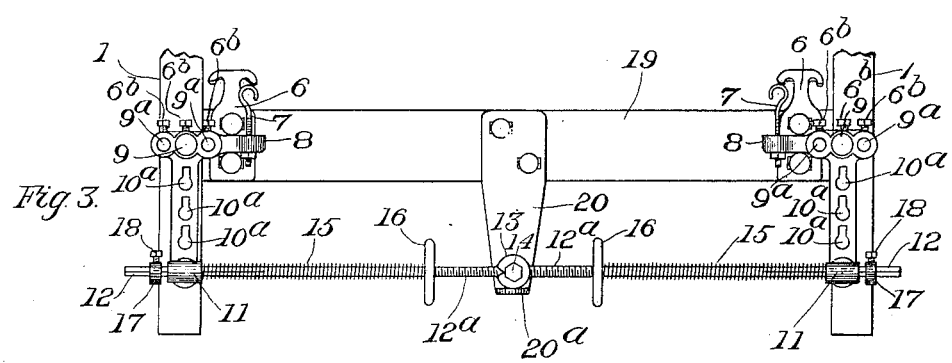
Fig. 3 is a rear elevation showing a modification of the stop for determining the working positions of the parts.

In Fig. 3 the construction is essentially the same as in Figs. 1 and 2, save that the rear girth 19 of the loom-frame has attached thereto a downwardly-extending bracket 20 having a horizontal projecting portion or step 20$^a$ forming a stop for the joined heads 13, 13, of the rods 12, 12, when the connecting joint of the said rods is in its operative position. The stop-shoulders 13$^a$, 13$^a$, of Figs. 1, 2, 4 and 5 are omitted.

In some cases it is sufficient, for the results desired in weaving, to employ a friction chain in connection with one head only of the yarn beam, as shown in Fig. 11, Sheet 3. In order to enable me to slacken the chain at the other end of the yarn beam, or to completely remove such chain, I make provision for locking the let-off lever at such end against movement so that it will serve as a stationary support or carrier for the collar or sleeve 11 which is engaged therewith. This locking of the let-off lever may be provided for in various ways which will be obvious to the skilled mechanic. I have herein shown each stand or bracket 6 as having its outer face formed with a series of vertical grooves 6$^c$, 6$^c$, Figs. 4 and 6, Sheet 2, intersecting the pivot-holes 6$^a$, 6$^a$, and the let-off lever as formed with corresponding ribs or projections 8$^a$, 8$^a$, Fig. 4, adapted to enter the said grooves. When the lever is required to turn on its pivot or fulcrum-pin, as during the ordinary use thereof, a washer 9$^c$, Fig. 4 is mounted upon the fulcrum-pin 9, between the grooved face of the stand or bracket and the rib or projection of the lever adjacent the hole 9$^a$ containing the said pin. This keeps the ribs or projections of the lever out of engagement with the grooves of the stand or bracket, and the lever unlocked. The lever therefore is free to swing under the action of the springs and in response to strains on the warps tending to occasion rocking of the warp-beam. When, however, the lever is to be locked in fixed position, the washer 9$^c$ is removed and the lever is pushed close up against the stand or bracket so that the ribs or projections of the lever enter the grooves of the stand or bracket, as at the left in the plan view, Fig. 12. In such figure the washer 9$^c$ is shown mounted upon the outer portion of pin 9, between the let-off lever and the head of the pin, merely for convenient safekeeping. I have shown a groove in connection with each of the pivot holes of the stand or bracket, and a rib or projection in connection with each of the holes in the let-off lever for the fulcrum-pin, but as will be apparent a single groove in the stand or bracket and a single rib or projection on the lever in some cases will be all that is needed, provided a washer of sufficient thickness to keep such rib or projection out of the groove, in which-ever pivot-hole the pin may be seated, is employed. That will be the fact in most cases.

Fig. 13 shows an embodiment of the leading principles of the invention in which I employ but one spring, 15ª, and one rod, 12ª, together with a special construction providing for throwing-off and throwing-on the friction. In this embodiment the down-hanging arm 10 of the let-off lever 8ᵇ at one side of the loom has swiveled thereto a collar or sleeve 21 receiving one end-portion of the rod 12ª. This end-portion is screw-threaded and receives thereon nuts 22, 22, at opposite ends of the said sleeve or collar, whereby the rod is locked and secured against endwise movement with reference to the collar or sleeve. The spring 15ª is confined between a collar constituted by a nut 16ª on the said threaded portion of the rod and a sliding collar 23 upon the rod adjacent the other end thereof. This collar 23 is engaged with the let-off lever 26 at that side of the loom by means of a stud 24 with which such collar is provided, entering and working within an inclined slot 25 in the down-hanging arm of the said let-off lever 26. The said slot 25 extends downward and inward toward the middle of the loom, and then is bent so as to form an offset or angular recess or notch, in which the said stud is held normally by the pressure of the expanding spiral spring 15ª and thereby retained against tendency to upward movement within the slot. A stop-collar 17ª is clamped by means of a screw 18ª upon the end-portion of the rod which projects beyond the sliding collar. As in the case of the construction shown in Figs. 1, 2 and 3, a short space of about one inch in practice is left between the outer end of the sliding sleeve or collar 23 and the said collar 17ª, to allow the spring pressure to have full effect upon sleeve or collar 23, and permit play of the collar and spring to accommodate eccentricity and irregularities of the beam-head or ruffles. While the stud or pin 24 of the sliding collar 23 occupies the recess or notch at the lower end of the slot 25 in the let-off lever 26 at the right-hand side of the loom, a part of the pressure of the spring in expanding is transmitted to the down-hanging arm of the said let-off lever, and thereby the said lever is operated to tighten the friction chain upon the ruffle or beam-head at that side of the loom. At the same time, the tendency of the spring to push the rod 12ª in the other direction causes the said rod, through its engagement with the collar or sleeve 21 connected with the arm 10 of the let-off lever 8ᵇ at the left-hand side of the loom, to apply pressure to the said let-off lever 8ᵇ so as to tighten the chain upon the ruffle or beam-head at that side of the loom. Thus equal amounts of friction are applied to the opposite ends of the beam. When it is desired to throw off the friction, the right-hand end of the rod will be lifted or struck upward by the weaver so as to disengage the pin 24 of the sliding collar 23 from the recess or notch at the lower end of the slot 25 in the let-off lever 26. The said pin 24 thereupon will slide upward within the said slot, permitting the spring to expand until the sliding collar 23 is in engagement with the stop-collar 17ª of the rod and the expansive action of the spring thereby is limited, and relieving the let-off levers from pressure so as to permit them to swing toward each other, relaxing the friction-chains until the said levers hang loosely. If the right-hand end of the rod be raised still further by the weaver, the action of the pin 24 in sliding upward along the inner wall of slot 25 will draw the down-hanging arms of the let-off levers closer toward each other, and thereby still further loosen the friction-chains. To restore the friction, the rod is pressed downward by the weaver. The descent of pin 24 within slot 25 will operate to cause collar or sleeve 23 to be pressed inwardly, separating it from stop-collar 17ª, such separation permiting the spring 15ª to act elastically to exert pressure in the one direction through collar 16ª, rod 12ª, and collar 21 to the left-hand let-off lever, and in the other direction through collar 23 and pin 24 to the right-hand let-off lever, causing the two let-off levers to tighten the friction-chains and reinstate the friction. When pin 24 arrives at the lower end of slot 25 the tendency of the spring to expand will cause such pin to reënter the offset retaining notch at said lower end, the notch however being shallow so that the collar 23 does not engage the collar 17ª.

In this construction, in the place of the stop-collar adjustably mounted upon the outer end of the rod by means of a clamping screw, a small pin passed through one of a series of holes in the rod may be utilized as an adjustable stop.

In the case of each of the let-off levers 8ᵇ and 26 of Fig 13 the same provisions for adjustment of the pivot pin 9 to vary the leverage are made as in the case of the construction previously described. The same provisions for enabling the respective let-off levers to be locked fixedly in position that have already been described are also made in connection with the said levers 8 and 26. As a further means of varying the leverage the down-hanging arm 10 of the left-hand let-off lever 8ᵇ is formed with a series of slots 10ª, 10ª, providing for the connection of the swiveling collar 21 with such lever at varying distances from the fulcrum of the lever. In this construction the series of slots 10ª, 10ª, is arranged in a curve which, in the usual adjustments of the parts, and when the friction is on as in Fig. 13, is concentric or substantially so with the notch of lever 26 that is occupied by pin 24 of the sliding collar 23, so that the distance from each of the respective holes to said notch shall be substantially uniform. This renders it unnecessary to adjust the collars upon the rod 12ª to compensate for a shift of the stud of collar 21 from one slot 10ª to another.

Fig. 14, Sheet 4, shows an embodiment of the invention in which at the left hand side the construction is the same as at the left hand side in Fig. 13, but the construction at the right-hand side providing for throwing-off and throwing-on the friction is different from that in Fig. 13. At the right hand side in Fig. 14 the sliding collar, 23ª, is formed at its underside with an enlargement containing an opening with downwardly flaring sides to receive between them a stud 24ª projecting from the down-hanging arm of the let-off lever 8 at said side of the loom. Normally the upper end of the opening or slot of the sliding collar rests upon the pin 24ª, and the spring 15ª acts through the sliding collar and the engagement of the inner wall of the narrow portion of the said opening or slot at said upper end with said pin to actuate the said let-off lever 8 to apply friction at the corresponding side of the loom, in addition to reacting upon the collar or nut 16ª at the other end of the rod 12 to move the rod endwise so as to actuate the let-off lever 8ᵇ at the left-hand side of the loom as explained with reference to Fig. 13. When it is desired to relieve the tension and friction temporarily, the rod simply is lifted so as to raise the narrow portion of the opening or slot in the sliding collar from the stud carried by the let-off lever. This permits the collar to slide outward along the rod and upward along pin 24ª, relieving the let-off levers of the spring-tension. The said collar moves outward upon the rod under the action of the spring in expanding until the sliding collar brings up against the stop-collar 17ª, which limits the capacity of the spring to expand. To restore the tension and friction, the rod is pressed down, the effect of the downward movement of the inner wall of the opening or slot of the collar 23ª in contact with the pin 24ª being to press the depending arm of lever 8 outward and the sliding collar 23ª inward until the narrow portion of the said opening or slot passes down upon the pin. By this action the spring will be compressed, and its tension will be caused to operate the let-off levers to tighten the chains and apply friction to the warp-beam. The compression of the spring will allow the sliding collar 23ª to separate from stop-collar 17ª again, as in Fig. 14. The button-hole slots 10ª 10ª, in the down-hanging arms of the two let-off levers, provide for adjustment of collar or sleeve 21 and pin 24ª toward and from the fulcrum-pins of the respective let-off levers, the adjustment and the provisions therefor being substantially as explained in connection with the collars or sleeves 11, 11, of Figs. 1, 2 and 3.

Fig. 15, Sheet 4, shows an embodiment of the invention in which the sliding collar or sleeve, 23ᵇ, is formed with a depending portion that is slotted to receive the stud 24ᵇ carried by the lever 8. The slot, 27, inclines downwardly and inwardly toward the middle of the loom, and is formed at its upper end with a retaining notch to receive and retain the said stud in the working position and relation of the parts. While the notch is occupied by the pin the spring is maintained in a state of compression, and operates the let-off levers to produce the required friction upon the heads or ruffles of the warp-beam. When it is desired to relieve the let-off levers of the effect of the spring, and thereby relieve the frictional resistance to the turning of the warp-beam, the rod is raised by the weaver so as to lift the retaining notch off the pin 24ª. This permits the collar to slide outward along the rod, and in doing so its slotted portion slides upward upon the pin 24ᵇ, the joint effect of which is to relieve the let-off levers of the spring-tension. The spring expands until it slides the collar outward into engagement with stop-collar 17ª. If the rod be further raised by the weaver, the outer wall of slot 27 will operate against pin 24ᵇ so as to cause the let-off levers to be drawn toward each other and further slacken the friction-chains. When it is desired to restore the friction, the rod is pressed down by application of the weaver's foot, or otherwise. As the inclined inner wall of the slot 27 slides down at the inner side of pin 24ª, the cam-action of said inclined wall causes the collar 23ᵇ to slide inward upon rod 12ª, compressing the spring 15ª and separating said collar from stop-collar 17ª until the said pin reënters the retaining notch.

Fig. 16, Sheet 5, shows in rear elevation an embodiment of the invention having a further modification of the means for throwing-off the effect of the spring in which a rotatable cam constitutes an element of the said means. Fig. 17 is a partial plan of the parts represented in Fig. 16. Figs. 18, 19 and 20 are views showing on an enlarged scale the details of the throwing-off means. In these figures the let-off lever 8 at the right-hand side of the loom corresponds with the let-off lever at the same side in Figs. 1, 2 and 3. The rod and spring, and the parts at the left-hand side of the loom, are the same as in Figs. 13, 14, and 15. The collar or sleeve 23ᶜ which is connected with the said right-hand let-off lever 8, and mounted upon the right-hand end-portion of the rod 12$^a$, has its outer end formed with an inclined or beveled cam-face for co-action with the corresponding but reversely inclined or beveled cam-face of the inner end of the throwing-off cam 28. The said cam is sleeved upon the outer portion of the rod 12$^a$ beyond the collar or sleeve 23$^c$ so as to be capable of turning around the rod. Its outer end is also furnished with a cam-face inclined in the same direction as the cam-face of the outer end of collar or sleeve 23$^c$, to co-act with the inclined or beveled cam-face of the inner end of a collar 29 that is made fast upon the outer extremity of the rod 12$^a$ by means of a clamping screw 30. The throwing-off cam 28 is furnished with an operating handle 28$^a$ by means of which it may be manually turned upon the rod 12$^a$. The normal positions and relations of the parts are as represented in Figs. 16, 17 and 18. In these views the handle 28$^a$ extends toward the front of the loom, and the inclined cam-faces of the opposite ends of the throwing-off cam are parallel with those of the adjacent ends of the sliding collar 23$^c$ and the fixed collar 29. Sufficient play is left between the throwing-off cam and the two collars to permit the spring 15$^a$ to expand fully to the extent required for operating the let-off levers to produce the required friction. When it is desired to throw-off the effect of the spring, and thereby relieve the warp-beam of friction, the weaver takes hold of the handle 28$^a$ and swings it rearward so as thereby to cause the throwing-off cam to make a half-turn, giving the said cam the position occupied by it in Figs. 19 and 20. In the turning movement of the cam its inclined cam-faces act against the cam-faces of the sliding collar 23$^c$ and fixed collar 29 to separate such collars from each other. Thus the cam acts to take up all play or looseness between the said collars, in addition to moving them oppositely so as to swing the vertical arms of the opposite let-off levers toward each other, thereby moving the let-off levers so as to slacken the chains 5, 5, in addition to taking the tension of the spring off the let-off levers. In order to enable the throwing-off cam to remain in the position occupied by it in Figs. 19 and 20 without tendency to return to its former position, the prominent portions or projections of the said cam and of the collars 23$^c$ and 29 are flattened, so that when the flattened surfaces are in engagement with each other the pressure of the parts against one another has no tendency to cause the throwing-off cam to turn.

Figs. 21 and 22, Sheet 6, show the invention embodied in connection with a compound-lever arrangement, the details of which are illustrated in Figs. 23 to 32, Sheet 7. Fig. 23 is a rear elevation of the parts at the left-hand side of the loom, omitting the connections between the stand 61, with the lever-system and the rod 12$^a$ shown partly in section. Fig. 24 is an end elevation of such parts. Fig. 25 is a plan view thereof, including the said stand 61. Fig. 26 is a plan view of lever 81. Figs. 27 to 32 show parts separately. This arrangement comprises a pair of levers 81, 82, at each side of the loom. The chain 5 at each side of the loom is engaged with a hook 7 that is connected with one arm of the lever 81 at such side, the said lever being horizontally disposed and mounted upon a pivot 9 upon the supporting stand 61. To permit adjustment of the leverage of the said lever, the said stand and the said lever have, respectively, as shown best in Figs. 23, 25 and 26, two hubs and holes for the reception of the pivot-pin or stud 9. The said adjustment is effected by a shift of the said pivot-pin or stud from one hole in the lever and stand to the other. The lever 82 is mounted by a pivot 91 upon the stand 61, the said lever 82 having an outwardly extending horizontal arm 82$^x$ which engages with the under side of the outwardly extending arm 81$^a$ of the first lever, the said second lever having also a downhanging arm. The downhanging arms of the levers 82, 82, at the two sides of the loom are connected by means of devices including a rod 12$^a$, a spring 15$^a$, a sliding collar 11$^d$ upon said rod engaging with the lever 82 at the right-hand side of the loom, a stop-collar 17$^a$ upon the end-portion of the rod beyond the sliding collar 11$^d$, and connections, presently to be described, between the left-hand end of the rod and the lever 82 at the left-hand side of the loom. The tendency of spring 15$^a$ to expand causes such spring to actuate the levers 81, 81, to draw the friction-chains tight around the heads or ruffles of the warp-beam. The devices which connect the rod 12$^a$ and the lever 82 at the left-hand side of the loom are contrived to provide for throwing-off and on the friction. They operate on a somewhat different principle from any of the arrangements which have thus far been described. The left-hand end of the rod 12$^a$ is engaged by a rigid connection with a block 31 which constitutes in effect a head for the said end of the rod. A link 33, shown separately in end elevation in Fig. 28 and in plan in Fig. 29, connects the block 31 with the downhanging arm of the adjacent lever 82. The link is swiveled to the said arm of the lever 82 by means of a stud 34 projecting from the outer end of the link, so as to give the link capacity for swinging movement in vertical plane. The link is engaged with the block by means of a stud entering and fitting a hole in the block. The block 31 is retained upon the pivot stud 32 by means of a screw 31ᵃ occupying a threaded hole in the block and entering by its tip into a groove 32ᵃ around the said stud. The described mode of connection between the block and the link permits them to swivel or turn relative to each other in a vertical plane. In the working relations of the parts, as shown in Figs. 21, 22, 23 and 25, the link 33 is in a straight line with the rod 12ᵃ and its head block 31. This gives the maximum effective length of the connection-members 12ᵃ, 21 and 33. For the purpose of enabling the said parts to be locked in the said straight line with one another so as to prevent the link and block from turning relative to each other around the connecting stud 32, the block 31 has a slot or notch 31ᵇ formed in its outer end, shown best in Fig. 27, and with the link 33 is combined a locking piece 35, shown separately in plan in Fig. 30, having an eye 35ᵃ to receive the stem of a pin 36, shown separately in Figs. 31 and 32, which connects the locking piece pivotally with the link. The said locking piece is furnished with a locking-pin or projection 35ᵇ which, when the locking-piece is swung from its unlocking position in Figs. 23, 24 and 25, around into the locking position shown in Figs. 21 and 22, works through a slot 33ᵃ, Fig. 23, in the link and enters the slot or notch 31ᵇ at the outer end of the block 31, when the block and the link are in the same straight line, as in Fig. 22. So long as the locking-pin or projection 35ᵇ occupies the notch or slot 31ᵇ the link and block are locked together so that the link constitutes in effect a rigid continuation of the rod 12ᵃ and serves to transmit the pushing pressure of the spring 15ᵃ to the adjacent lever 82. See Figs. 21 and 22. At the same time the reaction of the spring against the sliding collar 11ᵈ operates to transmit an equal amount of pressure to the opposite lever 82. When it is desired to throw-off the friction, the locking-piece 35 is swung rearwardly so as to withdraw its pin or projection 35ᵇ from the notch 31ᵇ of the block 31 and the slot 33ᵃ of the link. This renders the link and block free to turn relative to each other around the connecting-stud 32. If the connecting-stud 32 is not already located above a straight line extending from the pivotal point 34 to the point of pivotal connection between the collar 11ᵈ and the opposite lever 82, it may be raised by the weaver, for which purpose he may if he desires use the pin or projection 35ᵇ as a handle. The raising however may be effected by the weaver by taking hold of the rod or link at any point. With the point 32 of pivotal connection above the said straight line, and the parts unlocked as described, the spring 15ᵃ is free to occasion endwise movement of the rod 12ᵃ toward the left, thereby turning the link outward upon its point 34 of pivotal engagement with the left-hand lever 82, permitting the rod and link to double up upon themselves and thereby reducing their effective length. One effect of this action is to cause or permit the down-hanging arms of the levers 82, 82, to swing toward each other, thereby releasing the levers 81, 81, so as to permit the chains 5, 5, to slacken. Another result is to permit of relative sliding movement of the rod 12ᵃ and collar 11ᵈ with respect to each other until the said collar 11ᵈ and the stop-collar 17ᵃ engage with each other as in Fig. 33, thereby stopping-off the expansion of the spring and depriving it of the power to further actuate the let-off levers. If now the weaver, using pin or projection 35ᵇ as a handle, swings the locking member and link 33 farther to the left, the effect will be to swing the downhanging arms of the levers 82, 82, inward closer toward each other, still further slackening the friction-chains, the entire mechanism assuming the relaxed condition shown in Fig. 33. When it is desired to restore the friction, the link 33 is swung by the weaver over inward and down from its position in Fig. 33 to that in Figs. 21, 23 and 25. This operates the levers to tighten the friction-chains anew, and then the parts are again locked by swinging the locking-piece 35 upon its pivotal connection in Figs. 21 and 22, so as to cause its pin or projection 35ᵇ to pass through the slot 33ᵃ of the link and into the notch 31ᵇ at the outer end of the block 31. This restores the general mechanism to the condition shown in Fig. 21, and locks the block and rod and the link in their working relations so as to maintain the spring effective.

It is necessary that in turning the link from its position in Fig. 33 to that in Figs. 21 and 22, as just explained, the point of connection between such link and the block 31 should not be caused to pass down below the straight line connecting the points of pivotal connection with the lower ends of the two let-off levers 82, 82. For this purpose I provide a lip 33ᶜ, Figs. 25 and 29, upon the link, which by striking upon the top of the block limits the downward movement of the link relative to the block. It is important that the locking piece, when in position to lock the link and the block in working relations, should itself be locked so as to prevent it from accidentally becoming jarred or knocked into unlocking position. For this purpose the pin 36 which pivots the said locking piece to the link is furnished with a feather 36ᵃ, Figs. 31 and 32, on one side thereof, and the upper ear of the two ears on the link between which the locking piece is mounted is furnished at one side of the hole 33ᵈ therethrough (Fig. 29) with a notch 33ᵉ in which the said feather 36ᵃ is received. This prevents the said stud or pin from turning about its own axis. The hub-portion of the locking member is furnished with notches 35°, 35°, Fig. 30, at opposite sides of the hole 35ª therethrough, adapted to receive the said feather, and when the feather occupies either of the said notches the locking member is locked in whichever position it may then occupy. The pin 36 is made movable vertically, being prevented from complete withdrawal by the cotter pin 36ᵇ, Fig. 23, that is inserted into a hole in its lower head. When the pin occupies its lowered position the feather occupies a locking notch in the locking member. When it is desired to release the locking member to enable the block 31 to be unlocked, the pin is pushed up far enough to withdraw the feather from the said notch in the locking member. This permits the locking member to be turned by hand into its unlocking position. The pin is then dropped or pushed down so that its feather may enter the other of the notches in the locking member and lock the locking member in the open or inoperative position, in which the pin or projection 35ᵇ of the locking member will serve as a handle in swinging the link from its position in Figs. 21 and 22 to that in Fig. 33, or vice versa.

Fig. 34, Sheet 6, illustrates how the compound lever arrangement just described may be converted into a simple lever arrangement by disconnecting the chains from the levers 81, 81, shifting such levers to the outer pivotal mountings on the stands 61, 61, and permitting them to swing into idle positions, shifting the levers 82, 82, to the inner pivotal mountings on said stands, turning such levers so that their arms 81ˣ, 81ˣ, shall extend inwardly, and applying the chain-engaging hooks 7, 7, to the said short arms of the levers, 82, 82, the arrangement otherwise remaining unchanged. This mode of employing the parts may be found advisable or necessary in some connections not admitting of or requiring the use of compound levers as in Figs. 21 and 22.

The foregoing forms of embodiment of the principles of the invention are characterized by the employment of expansion or push-springs. The various principles are equally capable of embodiment with pull or contracting springs, and in various constructions and arrangements. By way of illustration I have shown in Figs. 35 to 49 several forms of embodiment containing contracting or pull-springs.

The first of the said forms of embodiment is shown applied in Fig. 35, Sheet 8, the characteristic features thereof being shown in sectional detail on an enlarged scale in Fig. 36. The contracting spiral spring 15ᵉ of this form has its opposite ends engaged with two short rods 12ᵉ, 12ᵉ. The respective rods extend through the respective collars or sleeves 21ᵉ, 23ᵉ, that are engaged with the let-off levers 8ᵉ, 26ᵉ. The outer portions of the said rods carry collars 22ᵉ, 22ᵉ, for engagement with the outer ends of the said collars or sleeves. The pin of the collar or sleeve 21ᵉ is engaged in a button-hole slot of the left-hand let-off lever 8ᵉ, and that of the collar or sleeve 23ᵉ is engaged in an offset retaining notch at the lower end of slot 25ᵉ in the right-hand let-off lever 26ᵉ. The let-off levers 8ᵉ and 26ᵉ resemble the levers 8 and 26 of the embodiment shown in Fig. 13, except that, owing to the fact that the contracting spring 15ᵉ exerts its power through the rods 12ᵉ, 12ᵉ, and collars 22ᵉ, 22ᵉ, against the outer ends of the collars or sleeves 21ᵉ, 23ᵉ, to draw the down-hanging arms of the let-off levers toward each other, the short arms of the said levers are reversed and face outward, away from each other, instead of inward toward each other as in Fig. 13, and except also that the slot 25ᵉ in lever 26ᵉ inclines downwardly and outwardly instead of downwardly and inwardly as in the case of slot 25 of Fig. 13, and has the offset retaining notch at its inner side instead of its outer side.

As one provision for adjustment of the tension of the spring, the rods 12ᵉ, 12ᵉ, are externally screw-threaded, and the collars 22ᵉ, 22ᵉ, are internally threaded and are screwed upon the said rods. By turning the said collars so as to screw them along the rods in one direction or the other, the said adjustment is effected. For convenience in connecting the spring and rods together, the inner end-portions of the rods are, in this instance, reduced in diameter and coarsely screw-threaded, and are screwed into the ends of the spring. The tension of the spring may be adjusted by screwing the rods farther into or out of the springs.

When the pin of collar or sleeve 23ᵉ is disengaged by the weaver from the retaining notch at the lower end of slot 25ᵉ, and caused to pass upward within the slot, the upward and inward inclination of the latter allows the said collar or sleeve to approach somewhat closer to collar or sleeve 21ᵉ under the pull of the spring 15ᵉ. To provide for stopping-off the spring and relieving the let-off levers of tension, I make provision for limiting the said approach of collar or sleeve 23ᵉ toward collar or sleeve 21ᵉ. The stopping-off means in this case is constituted by a tube 41ᵉ which incloses the spring and the inner portions of the rods 12ᵉ, 12ᵉ. The length of the said tube is a little short, say an inch, more or less, of the distance between the two collars or sleeves, in the working condition of the parts as represented in Figs. 35 and 36. When the upward movement of collar or sleeve 23ᵉ relative to lever 26ᵉ takes place, and the inward inclination of slot 25ᵉ allows said collar or sleeve to move closer toward collar or sleeve 21ᵉ, it contacts with the adjacent end of the tube and pushes the tube along until the other end of the tube hits against the collar or sleeve 21ᵉ. This prevents the spring from contracting any more, and consequently the levers are relieved of the tension of the spring. Should the weaver swing the rod still higher, the action of the stud of collar 23ᵉ against the outer inclined wall of slot 25ᵉ will swing the let-off levers outward so as to slacken the chains. Adjusting means of convenient character will be employed in connection with the collars or sleeves to regulate the extent of the approach of the said collars or sleeves before stopping-off of the spring takes place. In the present instance I show a tube 41ᵉ which is made variable in length. The adjustment of the length of the tube may be provided for in different ways. In this instance the tube is in sections, which are externally screw-threaded at their inner or meeting ends, and the said sections are united by means of an internally-threaded coupling-sleeve 41ˣ into which the said meeting ends are screwed. By turning the tube-sections into or out of the coupling-sleeve, the total length of the tube may be varied as required. If desired, the screw-threads of the inner end-portions of the tube-sections may be right-hand and left-hand, respectively, and the coupling-sleeve provided with right and left threads at its opposite ends, so that relative turning movement of the coupling sleeve will adjust the two tube-sections simultaneously either toward each other, or away from each other, as the case may be. The tube is supported at its opposite ends by the inner portions of the rods. It constitutes a cover or protection for the spring.

Figs. 37 to 42, Sheet 8, show an embodiment in which the let-off levers are similar to those of Figs. 35 and 36, but employing rods 12ᶠ, 12ᶠ, which are longer than the rods shown in Figs. 35 and 36. The length of the said rods, and the adjustments in practice, are such that in the working condition of the parts shown in Figs. 37 and 38, with the pin of the collar or sleeve 23ᵉ in the retaining notch at the lower end of slot 25ᵉ in lever 26ᵉ, and consequently with the friction on and the spring 15ᵉ extended, the inner ends of the rods will be separated a short distance from each other. The said distance will be sufficient to permit endwise play of the rods, and thereby enable the tension of the spring to take effect in operating the left-off levers to apply the required friction in connection with the warp-beam. The interval between said inner ends, however, will be such that when the right-hand collar or sleeve 23ᵉ is raised relative to lever 26ᵉ, so that the upward movement of the pin of said collar or sleeve in the slot 25ᵉ permits the said sleeve or collar to move inward toward the opposite collar or sleeve 21ᵉ, the said inner ends will come together to stop-off the spring and relieve the let-off levers of the tension thereof. In this embodiment, the screw-threaded portion of each rod receives nuts 22ᵉ, 22ᵉ, at opposite ends of the collar or sleeve 21ᵉ or 23ᵉ thereon, to fix said collar or sleeve at the required point upon the rod. This embodiment also contains a different means of engaging the ends of the spring with the respective rods, and adjusting the tension of the spring. The respective ends of the spring are screwed into internally-threaded coupling-sleeves 42, 42, surrounding the respective rods loosely. As shown in Figs. 39, 40, each of these coupling-sleeves has an external flange at its outer end, such flange being engaged by an inturned flange of a tension-adjustment nut 43, Figs. 41, 42, that is screwed upon the threaded portion of the rod. By screwing the said tension-adjustment nut along the rod, outward or inward, the tension of the spring is varied as required.

In the construction shown in Figs. 37 and 38 the inner ends of the two rods do not overlap, and their extreme inner ends merely butt against each other endwise when the spring is permitted to contract. Preferably, I halve the inner end-portions of the rods so as to fit together and overlap as the case of rods 12ᵍ, 12ᵍ, in Fig. 43, Sheet 8, and 44, 45, Sheet 9, forming thereby a longitudinally divided joint. The extreme end of the reduced extension of each rod is designed to engage with the shoulder on the other rod produced by the reduction of the rod, this engagement serving for stop-off purposes.

In Figs. 43, 44, 45, the swiveling sleeves or collars engaged with the lower ends of the let-off levers are dispensed with and the outer end-portions of the rods 12ᵍ, 12ᵍ, are formed with right-angled engaging portions 12ʰ, 12ʰ, adapted to work in the slots of the let-off levers, an inward extension 12ⁱ being formed upon the engaging portion of each rod. This inward extension is adapted to pass through the slot of the corresponding let-off lever when turned lengthwise of such slot in assembling the parts, thus permitting the parts readily to be assembled, but when the rod is turned down into the position relative to the lever that is shown in Fig. 43 the said extension projects alongside one side-portion of the let-off lever so as to prevent accidental disengagement of the engaging portion of the rod from the slot of the let-off lever.

Fig. 46, Sheet 9, shows a modification of the rods in which one rod 12ᵏ is formed with a longitudinal hole into which the said reduced extension 12^m of the first rod is entered. The said extension plays longitudinally within the said hole, and the contact of the shoulder of the one rod with the end of the other rod serves to stop-off the contracting action of the spring.

Fig. 47, Sheet 9, shows rods 12°, 12°, adapted to butt against each other at their inner ends as in Fig. 37, Sheet 8, but having their outer ends hook-shaped as in Figs. 43 to 46 for engagement with the let-off levers.

Figs. 48 and 49, Sheet 9, show a construction in which a long rod 12^p is employed, it having an adjustable nut 22^p upon its left-hand end for engagement with the outer end of the swiveling sleeve or collar 11^p that engages with the left-hand let-off lever 10^p. With the slotted right-hand let-off lever 26^p is pivotally engaged the spring connector 45 having a central opening through which the right-hand end-portion of the rod 12^p passes. A contracting spiral spring 15^p surrounds the intermediate portion of the rod. One end-portion of the said spring is engaged with the said spring-connector. In this instance the engagement is effected by screwing such portion of the spring into the internally-threaded opening through which the rod passes, such opening being somewhat larger in diameter than the rod. The other end-portion of the spring is engaged with a spring-connector in the form of a flanged sleeve 42^p. This latter spring-connector has its flange engaged by the hooked flanges of the tension-adjustment nut 43^p which is mounted upon the screw-threaded portion of the rod 12^p near the swiveling sleeve or collar 11^p that is engaged with the left-hand let-off lever 10^p. Adjustment of the tension-adjustment nut 43^p regulates the tension of the spring. The stop-off is provided for by means of a stop-collar 17^b on the right-hand portion of the rod, occupying an opening through the swiveled spring-connector and adjustable by means of a clamping screw 18^p upon the rod to regulate the amount of endwise play of the rod permitted, under the action of the spring when the said swiveling connector is raised in the slot 25^p of the right-hand let-off lever 26^p, before the said stop-collar engages with the inner end of the opening through the swiveling connector.

Figs. 50 to 53, Sheet 10 and Figs. 54 to 56, Sheet 3, show other constructions embodying expansion springs.

Figs. 50, 51, Sheet 10, show a construction in which a short rod 12^r is employed passing through a swiveling sleeve or collar 11^r in connection with the left-hand let-off lever 10^r and having mounted upon its screw-threaded portion an adjustable nut 22^r for engagement with the inner end of the said swiveling sleeve or collar. A connector 45^r adapted for engagement with the right-hand let-off lever 26^r is socketed at its inner end, such socket being internally screw-threaded. A rather long tube, 46, has its screw-threaded right-hand end screwed into the said socket. The left-hand portion of this tube fits over the inner portion of the rod 41^r and between the inner end of the rod and the closed end wall of the socket is confined an expanding spiral spring 15^r contained within the tube. For stop-off purposes means is provided for limiting the extent of the relative movement of the rod and tube when the right-hand end of the tube is raised relative to the right-hand let-off lever. In the present instance a cotter-pin 47 is seated in one of a series of holes 48 made transversely through the rod, and slots 46^r are formed in the left-hand end-portion of the tube, such slots extending longitudinally of the tube. Engagement of the left-hand end-walls of the said slots with the stem of the cotter-pin serves to limit the relative movement of the rod and tube under the expanding action of the spring, for stop-off purposes. For purposes of adjustment the holes of the said series are made in the rod at different points in its length.

Figs. 52, 53, Sheet 10, show a construction in which a rather long rod, 12^s, extends through the left-hand swiveling sleeve or collar 11^s, it carrying an adjustable nut 22^s upon its screw-threaded outer end, said nut engaging with the outer end of the said swiveling sleeve or collar. A long tube 46^s is furnished with a laterally projecting pin at its right-hand end which works in the slot 25^s of the corresponding let-off lever 26^s the said pin being flanged or headed to prevent accidental disengagement from the said let-off lever. Upon the inner end of the said tube is screwed a cap 47^s having a central hole through which the rod extends. Upon the inner end of the rod is provided a head or collar 12^t. The rod is surrounded between the cap and the head or collar by an expanding spiral spring 15^s. The said spring in expanding pushes the rod 12^s toward the right and the sleeve 46^s toward the left, thereby pulling the depending arms of the let-off levers 10^s, 26^s, toward each other. To stop-off the action of the spring and relieve the let-off levers of the tension thereof when the right-hand portion of the tube is raised, an adjustable stop is combined with the tube for co-action with the rod. This stop in the present case is constituted by a cotter-pin 17^s inserted into holes 46^t, 46^t, through the shell of the tube. These holes are made at different distances from the end of the tube to provide for adjustment.

Figs. 54, 55, 56, Sheet 3, show a modification in the means of connection between the swiveling collars 11ᵛ, 23ᵛ and the let-off levers 10ᵛ 10ᵛ. In this construction an expanding spiral spring 15ᵛ surrounds the rod 12ᵛ between the left-hand end swiveling sleeve or collar 11ᵛ and an adjustable nut or collar 16ᵛ upon the rod, and the said spring acts expansively to force the said sleeves or collars away from each other. In the respective let-off levers longitudinal slots 26ᵛ, 26ᵛ, are formed, which are undercut to receive the heads or flanges of the projecting pins 24ᵛ, Fig. 56, carried by the swiveling sleeves or collars. Notches 26ʷ, 26ʷ, are formed in the outstanding flanges at the outer side of these slots, below the fulcra of the levers, to receive the said pins. The tendency of the spring 15ᵛ to expand operates to press the said pins into the pair of notches of the opposite levers in which they have been placed by the loom-fixer or weaver, so as thereby to retain the sleeves or collars at the desired distances from the fulcra to the levers. As the tendency of the spring in expanding lengthwise is to press the pins of the sleeves or collars into the said notches, the said pins will not be likely to become disengaged accidentally. A pin, usually a cotter-pin, as at 49, may be passed through each let-off lever just below the notch into which the connecting pin of the corresponding sleeve or collar is placed, so that after the rod has been lifted by the foot of the weaver for the purpose of relieving the friction the said connecting pin shall not descend below the notch which it formerly occupied when the said end of the rod is again depressed through the pressure of the foot of the loom-fixer or weaver thereon.

The levers and the slots therein are shown extended above the fulcra of the levers and a notch 26ˣ, is formed in each lever above its fulcrum. When the connecting pins of the swiveling sleeves or collars 11ᵛ, 11ᵛ, are shifted to these notches 26ˣ, 26ˣ, above the fulcra of the levers, the tension of the spring 15ᵛ acts with a tendency to turn the let-off levers in the direction to relax the tension of the chains and relieve completely the friction in connection with the warp-beam. Suitable stops prevent excessive movement of the let-off levers under the action of the spring.

As will be apparent, the principles and features of the invention admit of being embodied in a great variety of varying constructions.

I claim as my invention:

1. In a friction let-off, the combination with a let-off lever, of a long horizontally extending spiral spring retaining throughout its usual working range an easy responsive resiliency, and a horizontally extending support for the length of said spring by which it is restrained from flexing.

2. In a friction let-off, the combination with a let-off lever, of a long horizontally extending spiral spring retaining throughout its usual working range an easy responsive resiliency, a horizontally extending support for the length of said spring by which it is restrained from flexure, and means to adjust the tension of the spring.

3. In a friction let-off, the combination with a let-off lever, of a long horizontally extending spiral spring retaining throughout its usual working range an easy responsive resiliency, a horizontally extending support for the length of said spring by which it is restrained from flexure, and means carried by the said support and adjustable lengthwise thereof to vary the spring-tension.

4. In a friction let-off, the combination with a let-off lever, of a long horizontally extending spiral spring retaining throughout its usual working range an easy responsive resiliency, a horizontally extending rod serving as an internal support for the spring, the said spring acting in the direction of the length of the rod to actuate the let-off lever, and an adjusting collar for the spring mounted upon the rod.

5. In a friction let-off, the combination with a let-off lever, of a horizontally extending rod in loose connection therewith, an adjustment collar upon said rod, and a horizontally extending long spiral spring, retaining throughout its usual working range an easy responsive resiliency, mounted upon said rod between the said collar and the let-off lever, and transmitting pressure to the latter.

6. In a friction let-off, the combination with a let-off lever, of a coupling-member connected therewith, a long horizontally extending spiral spring retaining throughout its usual working range an easy responsive resiliency and acting through said coupling-member to transmit pressure to the let-off lever, and a horizontally extending support for the length of said spring by which it is restrained from flexure.

7. In a friction let-off, the combination with a let-off lever, of a spiral spring by which pressure is transmitted to the lever to actuate the latter, and a spring-support adapted to be shifted into one position relative to the let-off lever in which the tension of the spring is effective to operate said lever and into a second position in which the friction is relieved.

8. In a friction let-off, the combination with a let-off lever, of a coupling-member connected therewith, a spiral spring by which pressure is transmitted through the coupling-member to the lever to actuate the latter, and a spring-support adapted to be shifted into one position relative to the let-off lever in which the tension of the spring is effective to operate the lever and into a second position in which the friction is relieved.

9. In a friction let-off, the combination with a let-off lever, of an actuating spring therefor and means to positively stop-off the spring-play and relieve the friction without material change in said tension.

10. In a friction let-off, the combination with a let-off lever, of an actuating spring therefor, and means to create an artificial limit to the spring-play and relieve the friction.

11. In a friction let-off, the combination with a let-off lever, of an actuating spring therefor, a spring-support, and stop-off means in connection with said support by which at will the spring-play tending to operate the lever may be stopped-off and the friction relieved.

12. In a friction let-off, the combination with a let-off lever, of a rod in loose connection therewith, a spring applied to the said rod and arranged to operate said lever, and positive stop-off means in connection with said rod by which at will the spring-play tending to operate the lever may be stopped-off and the friction relieved.

13. In a friction let-off, the combination with a let-off lever, of a rod in connection therewith, a spring applied to the said rod and arranged to operate said lever, and means for throwing off the friction without material lessening of the spring-tension.

14. In a friction let-off, the combination with a let-off lever, of a spring arranged to transmit pressure to said lever to operate the latter, a spring-support, and means in connection therewith to fix the limit of play of the spring relative to the support whereby by movement of the support the friction may be relieved.

15. In a friction let-off, the combination with a let-off lever, of a rod in sliding connection therewith, a spring mounted upon said rod and transmitting pressure to the lever, and positive stop-off means in connection with said rod by which at will the spring-play tending to operate the lever may be stopped-off.

16. In a friction let-off, the combination with a let-off lever, of a coupling-member connected therewith, a rod in sliding connection with said coupling-member, a spring mounted upon the rod and acting through the coupling-member to transmit pressure to the lever, and stop-off means in connection with the rod by which the spring-play tending to operate the lever may be stopped off.

17. In a friction let-off, the combination with a let-off lever, of a spring by which pressure is transmitted to the lever to actuate the latter, a spring-support adapted to be swung into one position relative to the let-off lever in which the tension of the spring is effective to operate the lever to produce friction, and stop-off means which in a second position of the spring-support stops-off the spring-play and operates the lever to relieve the friction.

18. In a friction let-off, the combination with a let-off lever, of a coupling-member connected with said lever, a spring-support in sliding connection with said coupling-member, a spring applied to said spring-support and in tensional engagement with the coupling-member, and a stop-off between which and the coupling-member there is play in the working relation of the parts, permitting the spring-tension to actuate the lever to produce friction, said spring-support adapted to be thrown to cause said stop-off to place a limit upon the tensional action of the spring and thereby relieve the pressure acting through the lever.

19. In a friction let-off the combination with a let-off lever, of a coupling-member in pivotal connection with said lever, a rod in sliding connection with said coupling-member, a spring upon said rod in tensional engagement with said coupling-member, and a stop-off between which and the coupling-member there is play in the working relation of the parts, permitting the spring-tension to actuate the lever to produce friction, said rod adapted to be thrown to cause said stop-off to place a limit upon the tensional action of the spring and relieve the friction.

20. In a friction let-off, the combination with oppositely-located let-off levers, of a long spiral spring exerting its tension between said levers to operate the latter to apply friction, said spring retaining throughout its usual working range an easy responsive resiliency, and a spring-support combined with both levers restraining the spring from flexure.

21. In a friction let-off, the combination with oppositely-located let-off levers, of a long spiral spring exerting its tension between said levers and operating the latter to apply friction, said spring retaining throughout its usual working range an easy responsive resiliency, a spring-support combined with both levers restraining the spring from flexure, and means in connection with said spring-support for adjusting the tension of the spring.

22. In a friction let-off, the combination with oppositely-located let-off levers, of a long spiral spring exerting its tension between said levers and operating the latter to apply friction, said spring retaining throughout its usual working range an easy responsive resiliency, a spring-support combined with both levers and restraining the spring from flexure, and an adjustable collar in connection with said spring-support for adjusting the tension of the spring.

23. In a friction let-off, the combination with opposite let-off levers, of a spring by which pressure is transmitted to the said levers to actuate the latter, a spring-support, and means in connection with said spring-support for positively stopping-off the spring-play and relieving the friction.

24. In a friction let-off, the combination with opposite let-off levers, of a spring-support combined with said levers and in loose connection with at least one thereof, a spring by which pressure is transmitted to the levers to actuate the latter, and means in connection with the spring-support for positively stopping-off the spring-play and relieving the friction.

25. In a friction let-off, the combination with a let-off lever, of a coupling-member, a spring acting through said coupling-member to actuate the lever, and a spring-support having a stop which on relative movement of the spring-support and coupling-member coacts with said coupling-member to stop-off the play of the spring and relieve the friction.

26. In a friction let-off, the combination with opposite let-off levers, of a spring, a coupling-member in connection with one of said levers, and a spring-support having a stop, said spring operating both of said levers and acting through said coupling-member upon the associated lever, and said spring-support capable of swinging adjustment which in one direction of adjustment permits engagement of the coupling-member and stop by which the spring-play is positively stopped off and the friction relieved.

27. In a friction let-off, the combination with opposite let-off levers, and a spring intermediate said levers by which the latter are operated, of means for locking either of said levers from movement under the action of the spring when it is desired that the other lever alone shall be operated by the spring to apply friction.

28. In a friction let-off, the combination with opposite let-off levers, of a spring by which pressure is transmitted to the said levers to actuate the latter, a spring-support, and means in connection with said spring-support for positively stopping-off the spring-play and relieving the friction.

28. In a friction let-off, the combination with opposite let-off levers respectively having adjustable fulcra providing for adjustment of the leverage, and a spring intermediate said levers by which the latter are operated, of means for locking either of said levers from movement under the action of the spring when it is desired that the other lever alone shall be operated by the spring to apply friction.

29. In a friction let-off, the combination with opposite let-off levers respectively having adjustable fulcra providing for adjustment of the leverage, and a spring intermediate said levers by which the latter are operated, of means for adjusting the spring-connection toward and from the fulcra of the levers, and means for locking either of said levers from movement under the action of the spring when it is desired that the other lever alone shall be operated by the spring to apply friction.

30. In a friction let-off, the combination with a let-off lever having key-hole slots at different distances from its fulcrum, of a coupling-member adjustable by means of said slots, a spring-support connecting with said coupling-member, and a spring acting through said coupling-member to operate the let-off lever.

31. In a friction let-off, the combination with a let-off lever having a series of fulcrum-sockets, and a support having a series of sockets for a fulcrum-stud, one of said members having a locking projection and the other recessed to receive said projection, of a fulcrum-stud adapted to be shifted to vary the leverage, and means for preventing locking engagement when said lever is required to swing upon said fulcrum-stud.

In testimony whereof I affix my signature in presence of two witnesses.

FRED LACEY.

Witnesses:
CHAS. F. RANDALL,
ELLEN O. SPRING.